United States Patent
Okada et al.

(10) Patent No.: US 8,611,206 B2
(45) Date of Patent: Dec. 17, 2013

(54) FAILURE-SECTION DETERMINING DEVICE AND FAILURE-SECTION DETERMINING METHOD

(75) Inventors: Sumiyo Okada, Kawasaki (JP); Noriyuki Fukuyama, Kawasaki (JP); Masanobu Morinaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 13/064,456

(22) Filed: Mar. 25, 2011

(65) Prior Publication Data

US 2011/0242992 A1    Oct. 6, 2011

(30) Foreign Application Priority Data

Apr. 2, 2010   (JP) ................................ 2010-086530

(51) Int. Cl.
*H04J 1/16* (2006.01)
(52) U.S. Cl.
USPC ............................ 370/216; 370/221; 370/225
(58) Field of Classification Search
USPC ................................................ 370/216–229
See application file for complete search history.

(56) References Cited

U.S. PATENT DOCUMENTS

| | | | | |
|---|---|---|---|---|
| 6,934,249 | B1 * | 8/2005 | Bertin et al. .................. | 370/218 |
| 7,551,635 | B2 * | 6/2009 | Mallya et al. .................. | 370/408 |
| 7,760,623 | B2 * | 7/2010 | Andersson et al. ............ | 370/225 |
| 8,305,884 | B2 * | 11/2012 | Ghodrat et al. ................ | 370/228 |
| 2001/0038471 | A1 * | 11/2001 | Agrawal et al. ............... | 359/110 |
| 2003/0152025 | A1 * | 8/2003 | Andersson et al. ........... | 370/216 |
| 2004/0095939 | A1 | 5/2004 | Yang | |
| 2006/0164976 | A1 * | 7/2006 | Grover et al. .................. | 370/228 |
| 2007/0076593 | A1 * | 4/2007 | Sakurai et al. ................. | 370/219 |
| 2009/0098823 | A1 | 4/2009 | Miyamoto | |
| 2009/0161537 | A1 * | 6/2009 | Andersson et al. ........... | 370/225 |
| 2010/0138488 | A1 * | 6/2010 | Fletcher et al. ............... | 709/203 |
| 2011/0242971 | A1 * | 10/2011 | Kokado ......................... | 370/226 |

FOREIGN PATENT DOCUMENTS

| | | |
|---|---|---|
| JP | 2003-500933 | 1/2003 |
| JP | 2004-228746 | 8/2004 |
| JP | 2006-080584 | 3/2006 |
| JP | 2006-108834 | 4/2006 |
| JP | 2006-246118 | 9/2006 |
| JP | 2007-036839 | 2/2007 |
| JP | 2009-044300 | 2/2009 |
| JP | 2009-094877 | 4/2009 |

\* cited by examiner

*Primary Examiner* — Andrew Lee
(74) *Attorney, Agent, or Firm* — Staas & Halsey LLP

(57) ABSTRACT

A loss determining unit of a monitoring device calculates a receiving-time interval between a receiving time of data and the receiving time of immediately previous data. If the interval is a predetermined threshold or higher, the loss determining unit determines that "a loss is detected" and calculates the number of losses. If the number of losses is lower than the threshold, the loss determining unit determines that "no loss is detected". A failure-section determining unit calculates the number of losses occurring in a first section. The failure-section determining unit calculates the number of losses occurring in a second section. If the loss is detected in the first section, the failure-section determining unit determines that a failure occurs in the first section. If the loss is detected in the second section, the failure-section determining unit determines that a failure occurs in the second section.

8 Claims, 21 Drawing Sheets

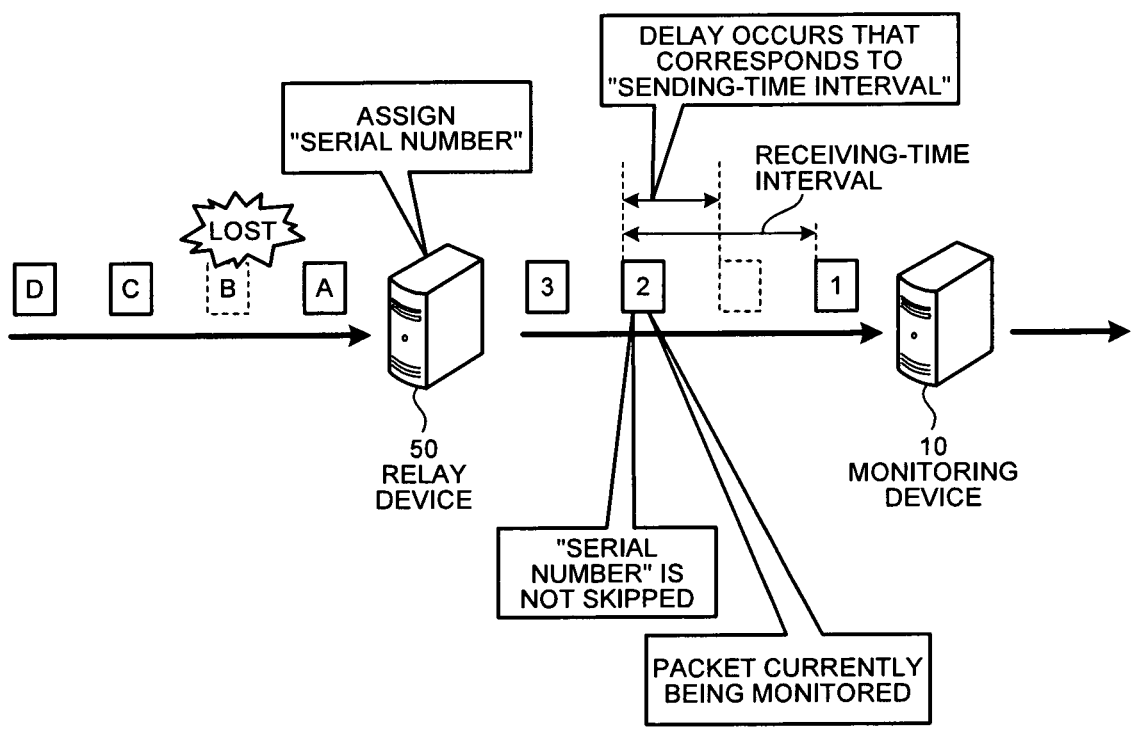

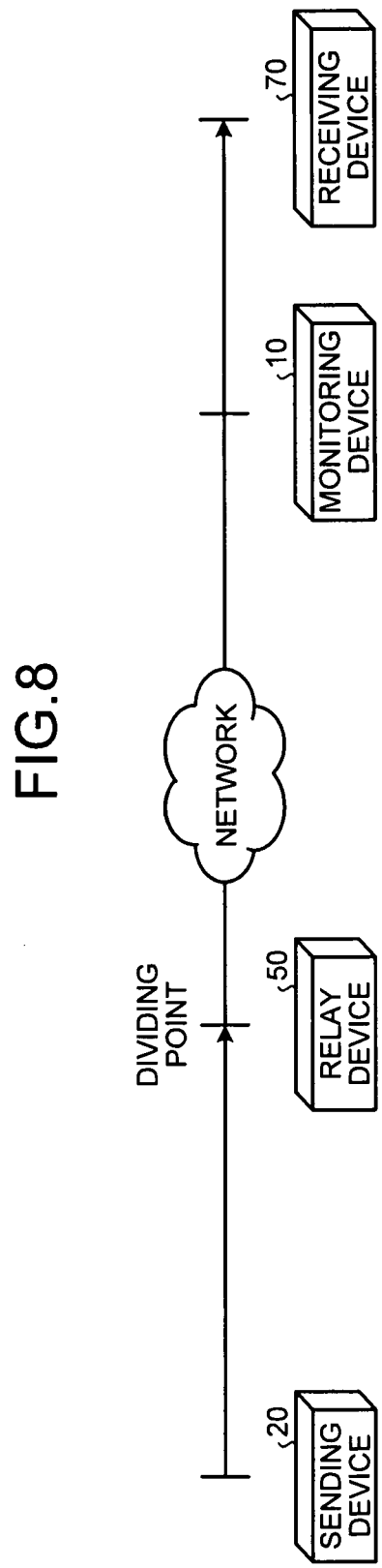

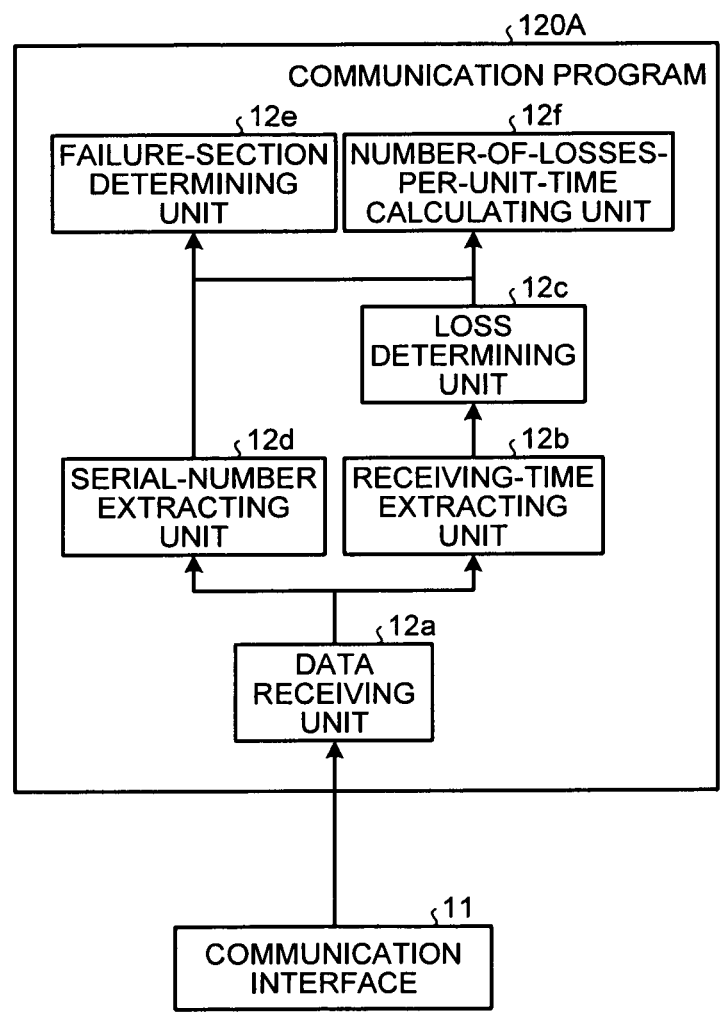

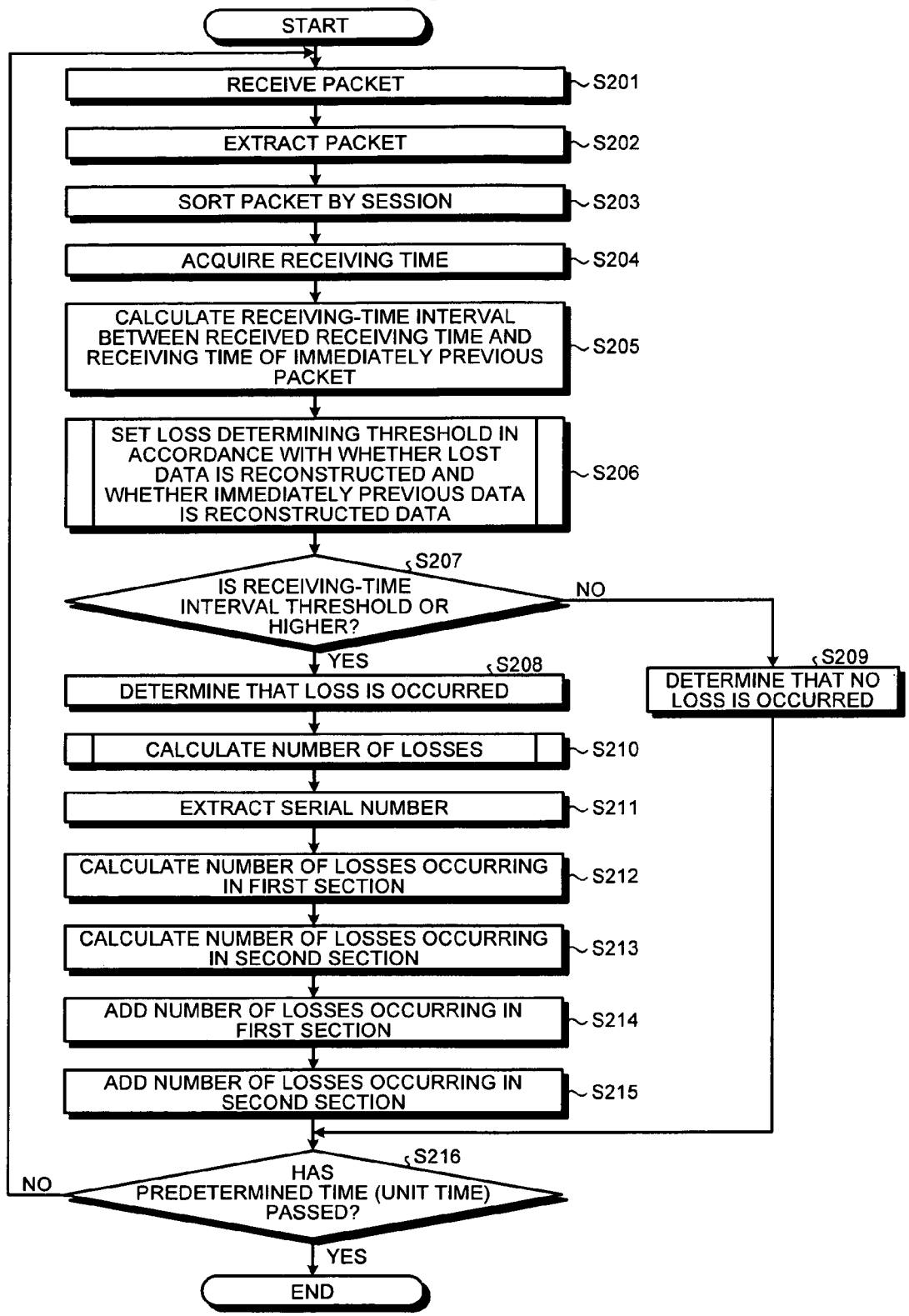

RECONSTRUCTED DATA IS PRESENT

FIG.18
IF DATA ARRIVES AT INTERVAL JUST EQUAL
TO SENDING-TIME INTERVAL (E.G., 20 ms)
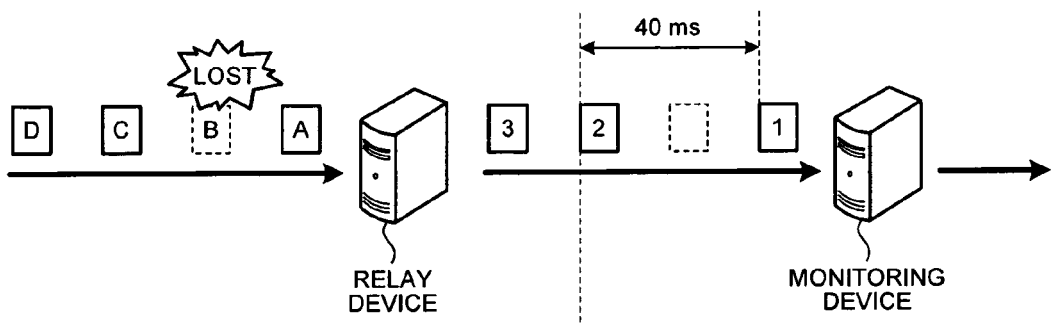
IF DATA ARRIVES AT INTERVAL SLIGHTLY
DIFFERENT FROM SENDING-TIME
INTERVAL (E.G., 20 ms)
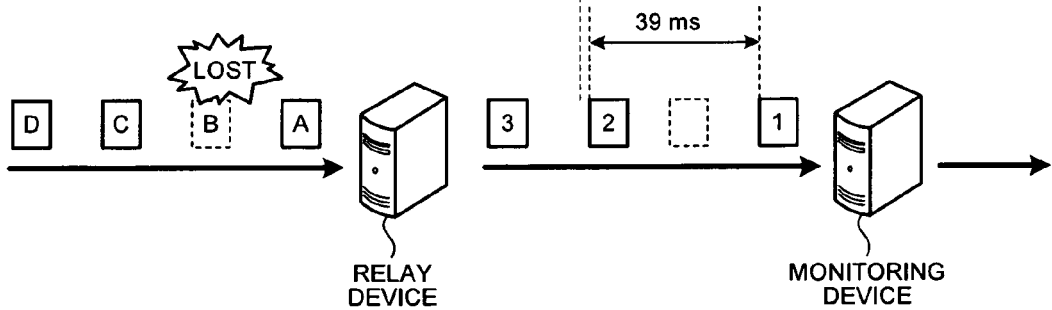

FAILURE-SECTION DETERMINING DEVICE AND FAILURE-SECTION DETERMINING METHOD

CROSS-REFERENCE TO RELATED APPLICATION

This application is based upon and claims the benefit of priority of the prior Japanese Patent Application No. 2010-086530, filed on Apr. 2, 2010, the entire contents of which are incorporated herein by reference.

FIELD

The embodiments discussed herein are directed to a failure-section determining device and a failure-section determining method.

BACKGROUND

With the modern development of information technologies, two-way communications via a network are activated more and more. In two-way communications, some use a communication system based on Voice over Internet Protocol (VoIP) that enables voice calls via the Internet by sending/receiving packetized voice data via a communication network.

As the volume of IP telephone calls transacted via a packet communication network increases, the IP phone providers, etc., put more emphasis on monitoring the quality of telephone calls. In order to identify a point at which a failure occurs in a communication system, a monitoring device is installed to monitor the quality of network communications. More particularly, a monitoring device calculates, for example, a disappearance rate of packets flowing in a packet communication network and a delay of packets, thereby measuring the communication quality and then identifies a point at which a failure occurs during a monitoring process.

Positions where monitoring devices are installed are described with reference to FIG. 17. As illustrated in FIG. 17, a communication system includes a sending device that sends packets, a relay device that relays packets, monitoring devices that monitor packets, and a receiving device that receives packets. In the example of FIG. 17, the system has two sections: a first section covers from the sending device to the relay device, and a second section covers the relay section to the receiving device. The point that divides the first section from the second section is called "dividing point". A monitoring device is located in the first section and monitors the first section; and another monitoring device is located in the second section and monitors the second section.

In the above system, the monitoring device located in the first section measures the communication quality of packets coming from the sending device and monitors whether a failure occurs in the first section. The monitoring device located in the second section measures the communication quality of forward packets coming from the relay device and monitors whether a failure occurs in the second section (more accurately, area from the dividing point to the second monitoring device). The relay device assigns a sequence number to a packet coming from the sending device and then forwards the packet to the receiving device.

Patent Document 1: Japanese Laid-open Patent Publication No. 2006-108834

Patent Document 2: Japanese Laid-open Patent Publication No. 2009-94877

Patent Document 3: Japanese National Publication of International Patent Application No. 2003-500933

In the above packet-monitoring communication system, in order to identify a failure as either a failure that occurs in the first section or a failure that occurs in the second section, a monitoring device is located on each section. This limits positions where monitoring devices can be installed and increases the number of monitoring devices installed and thus increases the costs for installation of monitoring devices.

SUMMARY

According to an aspect of an embodiment of the invention, a failure-section determining device is located between a relay device and a receiving device, the relay device being located between a sending device and the receiving device. The failure-section determining device includes a data receiving unit that sequentially receives data assigned with a serial number by the relay device; a receiving-time acquiring unit that acquires a receiving time of the data received by the data receiving unit; a loss determining unit that calculates a receiving-time interval using the receiving time and a receiving time of immediately previous data, determines that a loss occurs when the receiving-time interval is a predetermined threshold or higher, and calculates the number of losses using the receiving-time interval and a data sending-time interval; a serial-number acquiring unit that acquires the serial number of the data received by the data receiving unit; a failure-section determining unit that calculates the number of losses occurring in a first section between the sending device and the relay device, using the serial number acquired by the serial-number acquiring unit and a serial number of an immediately previous packet, and calculates the number of losses occurring in a second section between the relay device and the monitoring device, using the number of losses calculated by the loss determining unit and the number of losses occurring in the first section.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a schematic diagram that illustrates a process for determining a failure point when a failure occurs at a point before the relay device;

FIG. 8 is a schematic diagram that illustrates effects of the monitoring device according to the second embodiment;

FIG. 9 is a block diagram of the functional configuration of a communication program executed by a monitoring device according to a third embodiment;

FIG. 10A is a flowchart of a process performed by the monitoring device according to the third embodiment;

FIG. 18 is a schematic diagram that illustrates a delay when data interval has fluctuation;

DESCRIPTION OF EMBODIMENTS

Preferred embodiments of the present invention will be explained with reference to accompanying drawings. The present invention is not limited to the following embodiments.

[a] First Embodiment

Figure 1:
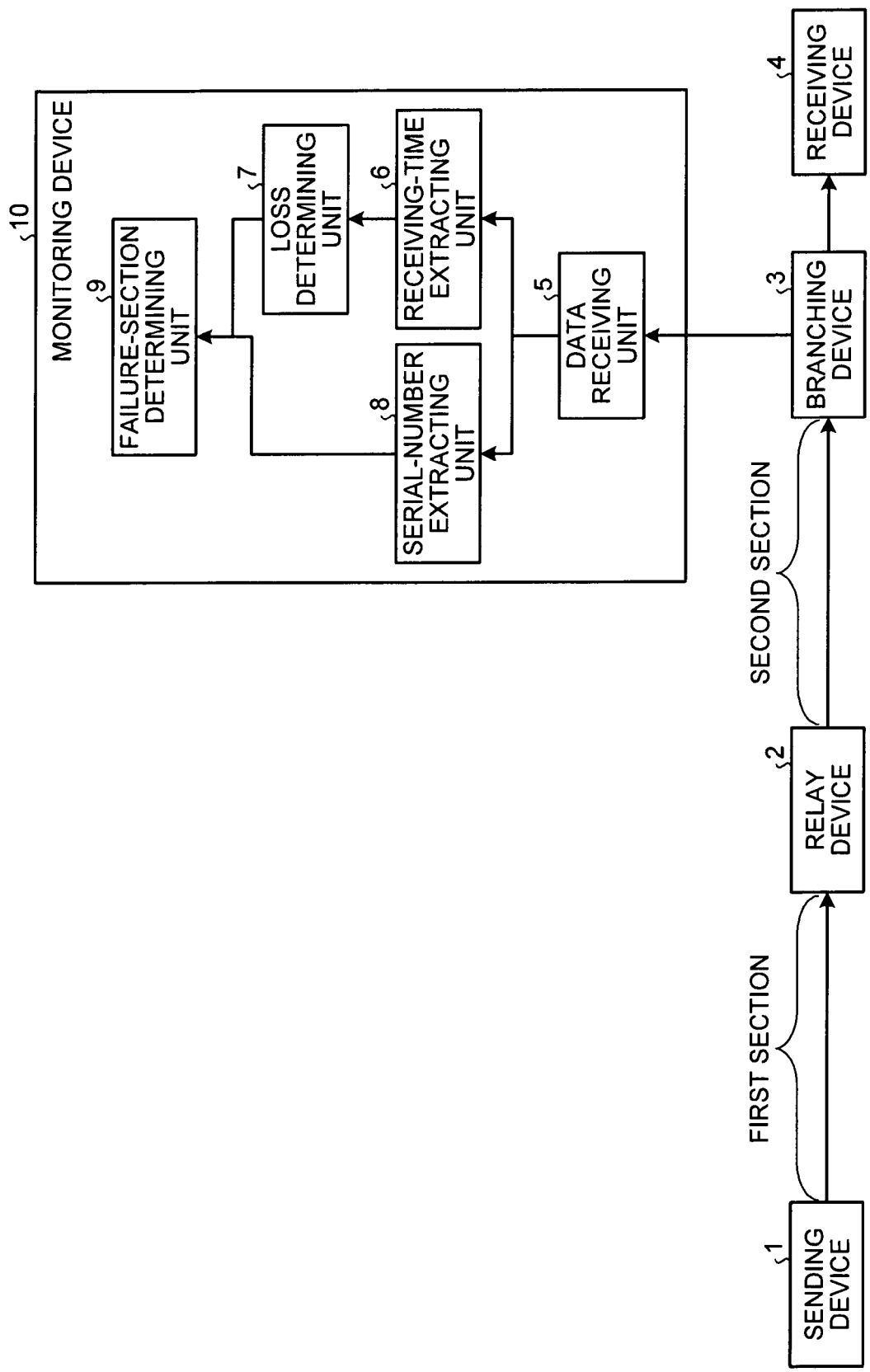
FIG. 1 is a block diagram of the configuration of a monitoring device according to a first embodiment.

The configuration of a monitoring device according to a first embodiment is described below with reference to FIG. 1. FIG. 1 is a block diagram of the configuration of a monitoring device according to the first embodiment.

A monitoring device 10 according to the first embodiment includes a data receiving unit 5, a receiving-time extracting unit 6, a loss determining unit 7, a serial-number extracting unit 8, and a failure-section determining unit 9. The monitoring device 10 monitors data coming from a relay device 2 and being on a network. The relay device 2 is located between a sending device 1 and a receiving device 4 and relays data coming from the sending device 1 to the receiving device 4. The relay device 2 assigns a serial number to the data. In the example of FIG. 1, a section from the sending device 1 to the relay device 2 is set to be a first section; a section from the relay device 2 to the monitoring device 10 is set to be a second section. The monitoring device 10 acquires data from a branching device 3 that is located between the relay device 2 and the receiving device 4.

The data receiving unit 5 sequentially receives data assigned with the serial number by the relay device 2 that is located between the sending device 1 and the receiving device 4. The receiving-time extracting unit 6 extracts the receiving time of the data received by the data receiving unit 5 and sends the receiving time to the loss determining unit 7. The loss determining unit 7 calculates, using the receiving time received from the receiving-time extracting unit 6 and a receiving time of immediately previous data, a receiving-time interval between the receiving time of the data received by the data receiving unit 5 and the receiving time of the immediately previous data. If the receiving-time interval is a predetermined threshold or higher, the loss determining unit 7 determines that "a loss is detected" and then calculates, using the receiving-time interval and the sending-time interval, the number of losses. If the number of losses is lower than the threshold, the loss determining unit 7 determines that "no loss is detected".

The serial-number extracting unit 8 extracts a serial number from data received by the data receiving unit 5 and sends the serial number to the failure-section determining unit 9. The failure-section determining unit 9 calculates, using the serial number received from the serial-number extracting unit 8 and a serial number of immediately previous data, the number of losses occurring in the first section. The failure-section determining unit 9 also calculates, using the number of losses calculated by the loss determining unit 7 and the number of losses occurring in the first section, the number of losses occurring in the second section. If a loss is detected in the first section, it is determined that the loss occurs at a point before the relay device 2 and a failure occurs in the first section covering from the sending device 1 to the relay device 2.

If a loss is detected in the second section, the failure-section determining unit 9 determines that the loss occurs after the relay device 2 assigns the serial number to the data and that a failure occurs in the second section covering from the relay device 2 to the monitoring device 10.

As described above, even if the monitoring device 10 is upstream of the relay device 2, being closer to the receiving device 4 than the relay device 2, the monitoring device 10 can identify a failure as either a failure occurring in the first section covering from the sending device 1 to the relay device 2 or a failure occurring in the second section covering from the relay device 2 to the monitoring device 10. With this configuration, positions where the monitoring device 10 can be installed are not limited. Moreover, when one monitoring device 10 is located upstream of the relay device 2, monitor is conducted with a decreased number of monitoring points and a decreased number of installed monitoring devices 10. This reduces the costs for installation of monitoring devices 10.

[b] Second Embodiment

In the following, the configuration of a communication system and the configuration of a monitoring device according to the second embodiment are described and then the processes performed by the communication system and the monitoring device are described. Finally, the effects of a second embodiment are described. In the second embodiment, packetized voice data is transacted.

Configuration of the Monitoring Device

Figure 2:
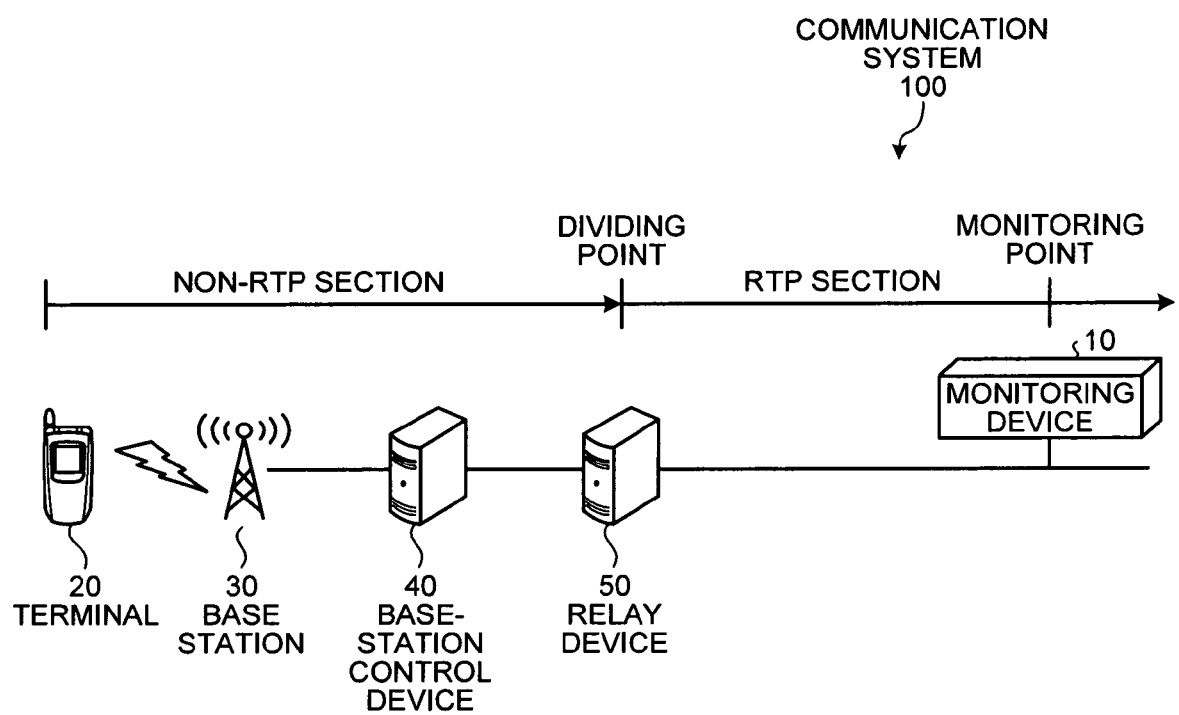
FIG. 2 is a schematic diagram of the configuration of a communication system according to a second embodiment.

The configuration of a communication system is described below with reference to FIG. 2. The communication system includes a monitoring device. FIG. 2 is a schematic diagram of the configuration of a communication system according to the second embodiment. As illustrated in FIG. 2, a communication system 100 includes the monitoring device 10, a terminal 20, a base station 30, a base-station control device 40, and a relay device 50. A section from the terminal 20 to the relay device 50 is set to be a non-RTP section, and a section from the relay device 50 to the monitoring device 10 is set to be an RTP section. Any packet of the RTP section has a sequence number in the RTP header.

The monitoring device 10 receives a packet flowing in the RTP section, analyzes the received packet to check whether a loss occurs, and, if a packet loss is detected, identifies a section where the packet is lost.

The terminal 20 is a sender terminal of packets and sends/receives data to/from another terminal or a like via the base station 30 and the relay device 50. The base station 30 wirelessly receives voice data from the terminal 20.

The base-station control device 40 assigns wireless channels and switches between the wireless channels. The relay device 50 receives a packet of voice data coming from the terminal 20, assigns a sequence number to the RTP header of the received packet, and forwards the packet to a receiving device.

Figure 3:
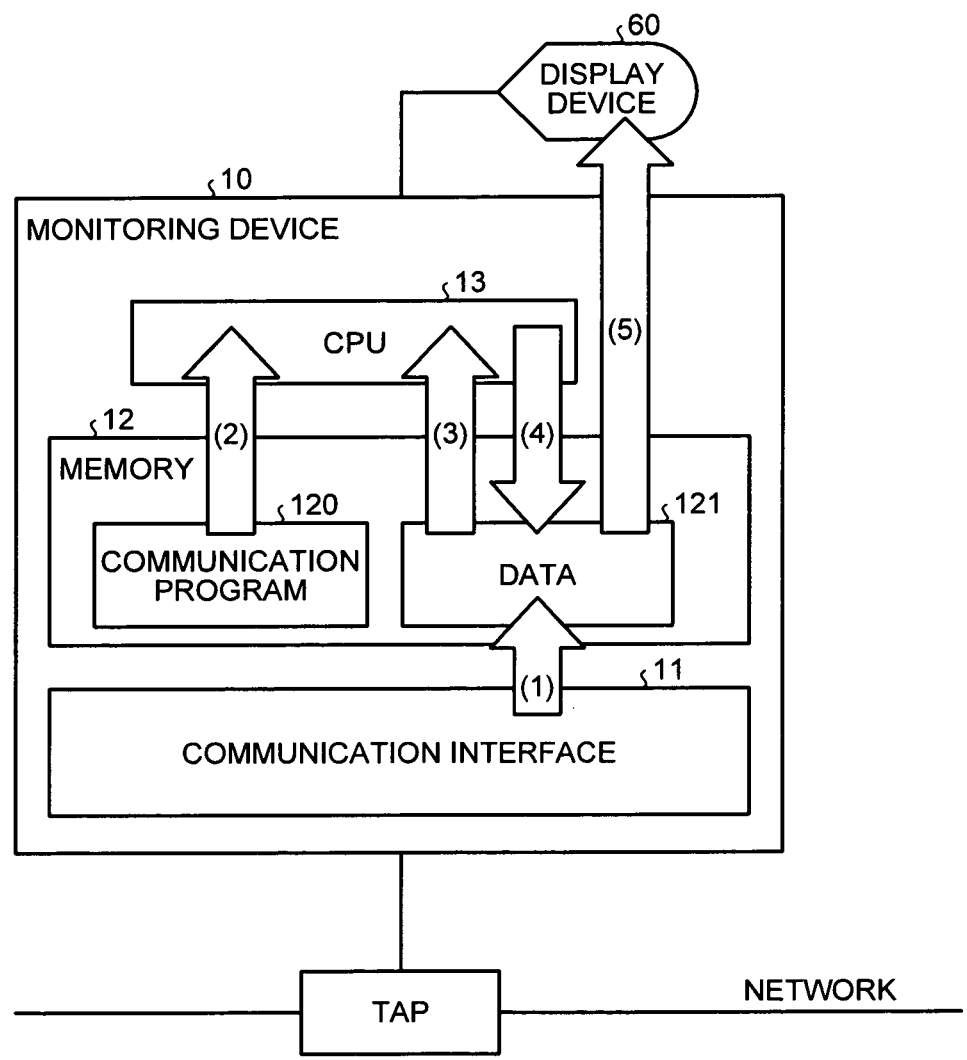
FIG. 3 is a block diagram of the configuration of a monitoring device according to the second embodiment.

The configuration of the monitoring device 10 illustrated in FIG. 2 is described below with reference to FIG. 3. FIG. 3 is a block diagram of the configuration of the monitoring device 10 according to the second embodiment. As illustrated in FIG. 3, the monitoring device 10 includes a communication interface 11, a memory 12, and a CPU 13 and the monitoring device is connected to a display device 60.

The communication interface 11 sequentially receives packets flowing on the network and writes the received packets to the memory 12 (see (1) of FIG. 3). More particularly, the communication interface 11 sequentially receives the packets each assigned with the sequence number by the relay device 50 and writes the received packets to the memory 12.

The memory 12 stores therein a communication program 120 and data 121 that are needed when the CPU 13 performs communication processes. As described in details later with reference to FIG. 4, the communication program 120 causes the CPU to analyze packets to check whether any packet is lost and, if a packet loss is detected, identify a section where the packet is lost. The data 121 is data of packets received by the communication interface 11.

The CPU 13 reads and executes the communication program from the memory 12 (see (2) of FIG. 3), analyzes data of packets stored in the memory 12 (see (3) of FIG. 3), and stores an analysis result in the memory 12 (see (4) of FIG. 3). More particularly, the CPU 13 analyzes data of packets stored in the memory 12 and, if a packet loss is detected, identifies a section where the packet is lost, and stores an analysis result in the memory 12.

The display device 60 reads the analysis result from the memory 12 and then displays the analysis result thereon. More particularly, the display device 60 displays whether any packet is lost or not and, if any packet is lost, a section where the packet is lost.

Figure 4:
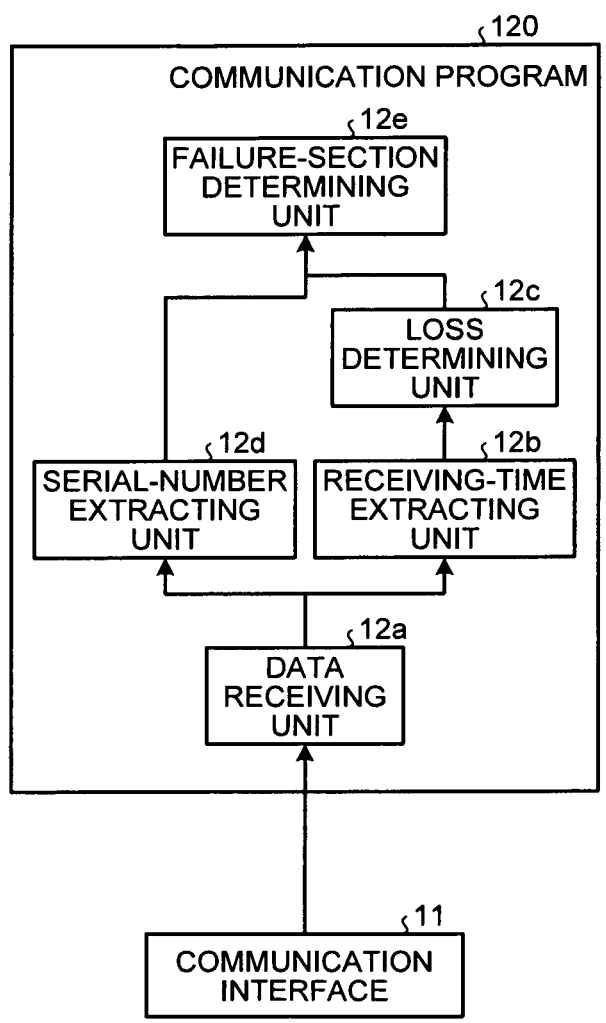
FIG. 4 is a block diagram of a communication program executed by the monitoring device according to the second embodiment.

The functional configuration of the communication program 120 is described below with reference to FIG. 4. FIG. 4 is a block diagram of the communication program 120 executed by the monitoring device 10 according to the second embodiment. As illustrated in FIG. 4, the communication program 120 includes a data receiving unit 12a, a receiving-time extracting unit 12b, a loss determining unit 12c, a serial-number extracting unit 12d, and a failure-section determining unit 12e.

The data receiving unit 12a acquires packets received by the communication interface 11 and sorts the packets by session. More particularly, the data receiving unit 12a acquires packets received by the communication interface 11, sorts the packets by session, and sends the packets to the receiving-time extracting unit 12b and the serial-number extracting unit 12d.

The receiving-time extracting unit 12b extracts a receiving time from a packet that is received by the communication interface 11 and sends the receiving time to the loss determining unit 12c. The loss determining unit 12c calculates, using the receiving time received from the receiving-time extracting unit 12b and a receiving time of an immediately previous packet, a receiving-time interval between the receiving time of the packet received by the data receiving unit 12a and the receiving time of the immediately previous packet. If the receiving-time interval is a predetermined threshold or higher, the loss determining unit 12c determines that "a loss is detected" and then calculates, using the receiving-time interval and the sending-time interval, the number of losses. If the number of losses is lower than the threshold, the loss determining unit 12c determines that "no loss is detected".

The serial-number extracting unit 12d extracts a sequence number of a packet that is received by the communication interface 11 and sends the sequence number to the failure-section determining unit 12e. The failure-section determining unit 12e calculates, using the sequence number received from the serial-number extracting unit 12d and a sequence number of an immediately previous packet, the number of losses occurring in the first section. The failure-section determining unit 12e also calculates, using the number of losses calculated by the loss determining unit 12c and the number of losses occurring in the first section, the number of losses occurring in the second section.

If a loss is detected in the first section, the failure-section determining unit 12e determines that a failure occurs in the non-RTP section covering from the terminal 20 to the relay device 50. If a loss is detected in the second section, the failure-section determining unit 12e determines that a failure occurs in the RTP section covering from the relay device 50 to the monitoring device 10.

Figure 5:
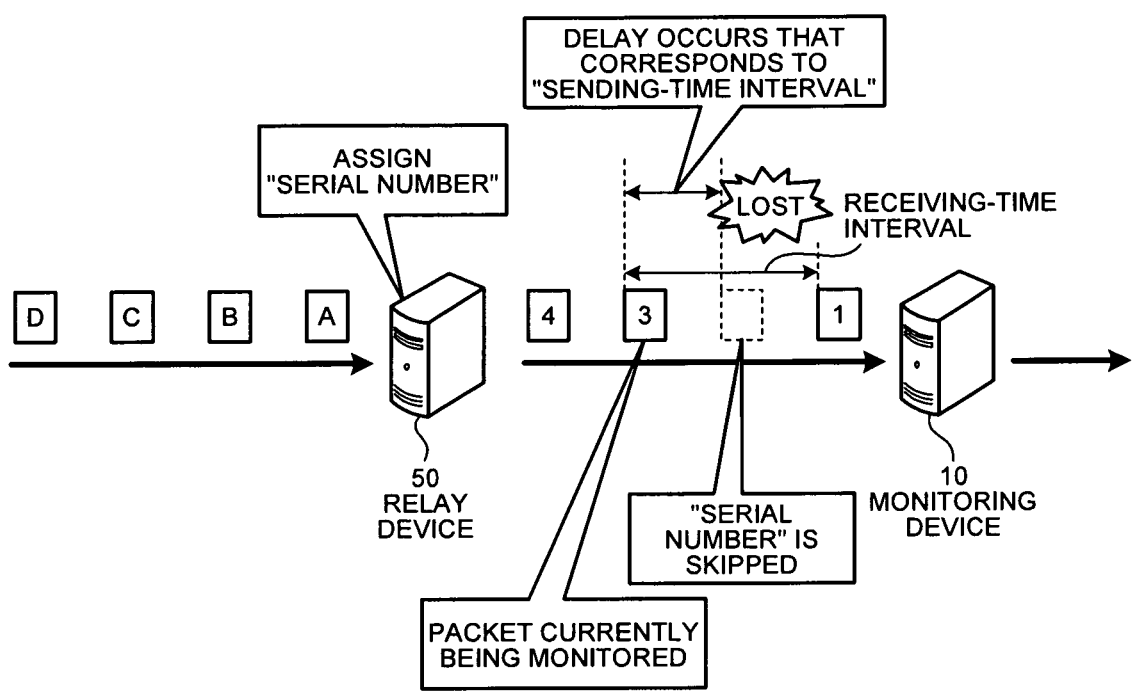
FIG. 5 is a schematic diagram that illustrates a process for determining a failure point when a failure occurs at a point after the relay device.

A process for determining a failure section is described below with reference to FIG. 5. In the following example, a failure occurs at a position after the relay device 50. FIG. 5 is a schematic diagram that illustrates a process for determining a failure point when a failure occurs at a point after the relay device 50. As illustrated in FIG. 5, the relay device 50 assigns sequence numbers 1 to 4 to packets A to D, respectively.

If, after the sequence numbers are assigned, a failure occurs in a section after the relay device and the packet assigned with the sequence number "2" is lost, a delay that corresponds to the "sending-time interval" occurs and the sequence number "2" is skipped. Because the packet with the sequence number "2" is missed, the monitoring device 10 receives the packet with sequence number "1" and then the packet with the sequence number "3", skipping the packet with the sequence number "2".

The receiving-time extracting unit 12b extracts a receiving time from a packet received by the communication interface and sends the receiving time to the loss determining unit 12c. The loss determining unit 12c calculates, using the receiving time received from the receiving-time extracting unit 12b and a receiving time of an immediately previous packet, a receiving-time interval between the receiving time of the packet received by the data receiving unit 12a and the receiving time of the immediately previous packet. If the receiving-time interval is a predetermined threshold or higher, the loss determining unit 12c determines that "a loss is detected" and then calculates, using the receiving-time interval and the sending-time interval, the number of losses. If the number of losses is lower than the threshold, the loss determining unit 12c determines that "no loss is detected". The failure-section determining unit 12e calculates, using the sequence number received from the serial-number extracting unit 12d and the sequence number of the immediately previous packet, the number of losses occurring in the RTP section. The failure-section determining unit 12e also calculates, using the number of losses calculated by the loss determining unit 12c and the number of losses occurring in the RTP section, the number of losses occurring in the non-RTP section. If the number of losses occurring in the RTP section is larger than zero, it is determined that a packet is lost in the RTP section. If the number of losses occurring in the non-RTP section is larger than zero, it is determined that a packet is lost in the non-RTP section.

A process for determining a failure section is described below with reference to FIG. 6. In the following example, a failure occurs at a point before the relay device 50. FIG. 6 is a schematic diagram that illustrates a process for determining a failure point when a failure occurs at a point before the relay device 50. As illustrated in FIG. 6, packets A to D are sent but the packet "B" is lost at a point before the relay device 50. The relay device 50 receives the packets A, C, and D and then assigns the sequence numbers 1 to 3 to the packets A, C, and D, respectively.

Because the monitoring device 10 cannot receive the packet "B", the receiving-time interval between when the packet with the sequence number "1" is received and when the packet with the sequence number "2" is received increases. Moreover, because, in the situation illustrated in FIG. 6, the packets A to D are sent but the packet "B" is lost at a point before the relay device 50, the packet A is assigned with the sequence number "1" and the packet C is assigned with the sequence number "2", i.e., the sequence number "2" is not skipped.

The receiving-time extracting unit 12b extracts a receiving time from a packet that is received by the communication interface and sends the receiving time to the loss determining unit 12c. The loss determining unit 12c calculates, using the receiving time received from the receiving-time extracting unit 12b and a receiving time of an immediately previous packet, a receiving-time interval between the receiving time of the packet received by the data receiving unit 12a and the receiving time of the immediately previous packet. If the receiving-time interval is a predetermined threshold or higher, the loss determining unit 12c determines that "a loss is detected" and then calculates, using the receiving-time interval and the sending-time interval, the number of losses. If the number of losses is lower than the threshold, the loss determining unit 12c determines that "no loss is detected". The failure-section determining unit 12e calculates, using the sequence number received from the serial-number extracting unit 12d and the sequence number of the immediately previous packet, the number of losses occurring in the RTP section. The failure-section determining unit 12e also calculates, using the number of losses calculated by the loss determining unit 12c and the number of losses occurring in the RTP section, the number of losses occurring in the non-RTP section. If the number of losses occurring in the RTP section is larger than zero, it is determined that a packet is lost in the RTP section. If the number of losses occurring in the non-RTP section is larger than zero, it is determined that a packet is lost in the non-RTP section.

Processes Performed by the Monitoring Device

Figure 7A:
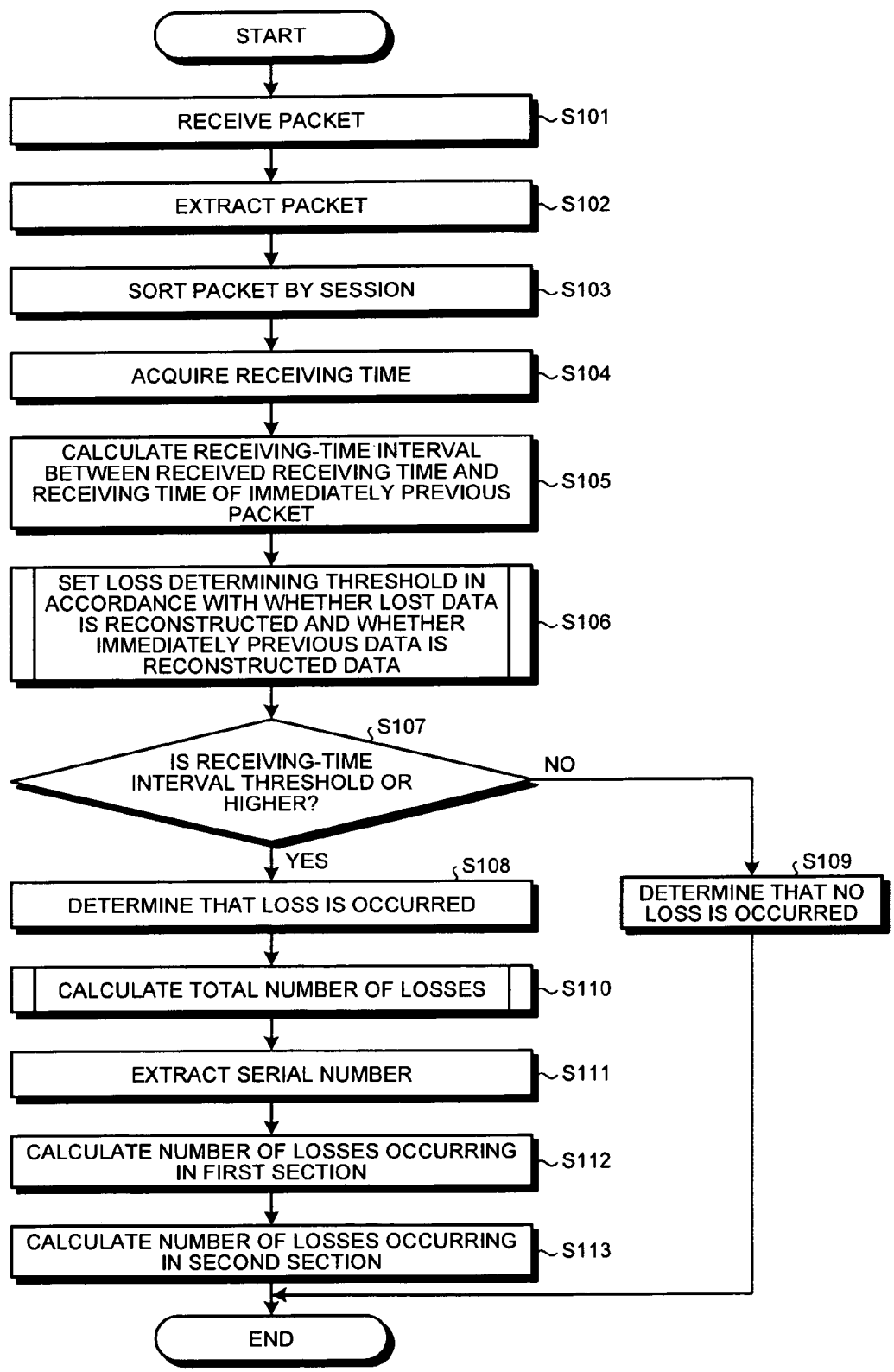
FIG. 7A is a flowchart of a process performed by the monitoring device according to the second embodiment.
Figure 7B:
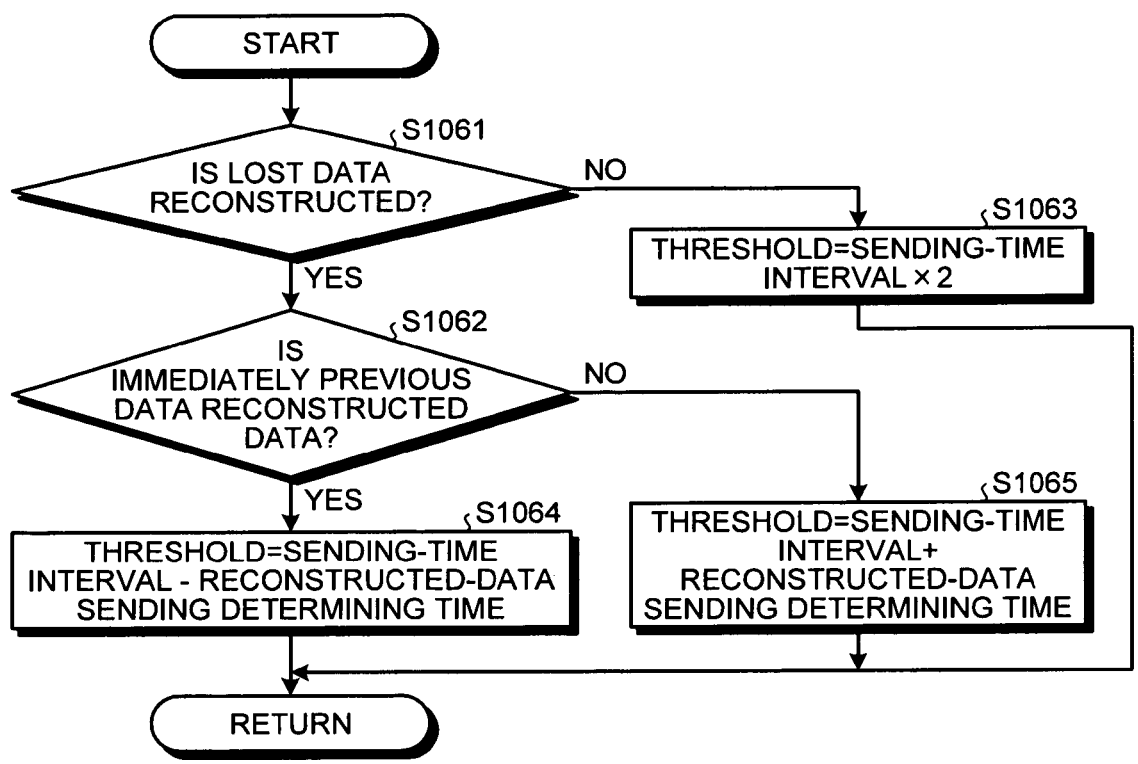
FIG. 7B is a flowchart of another process performed by the monitoring device according to the second embodiment.
Figure 7C:
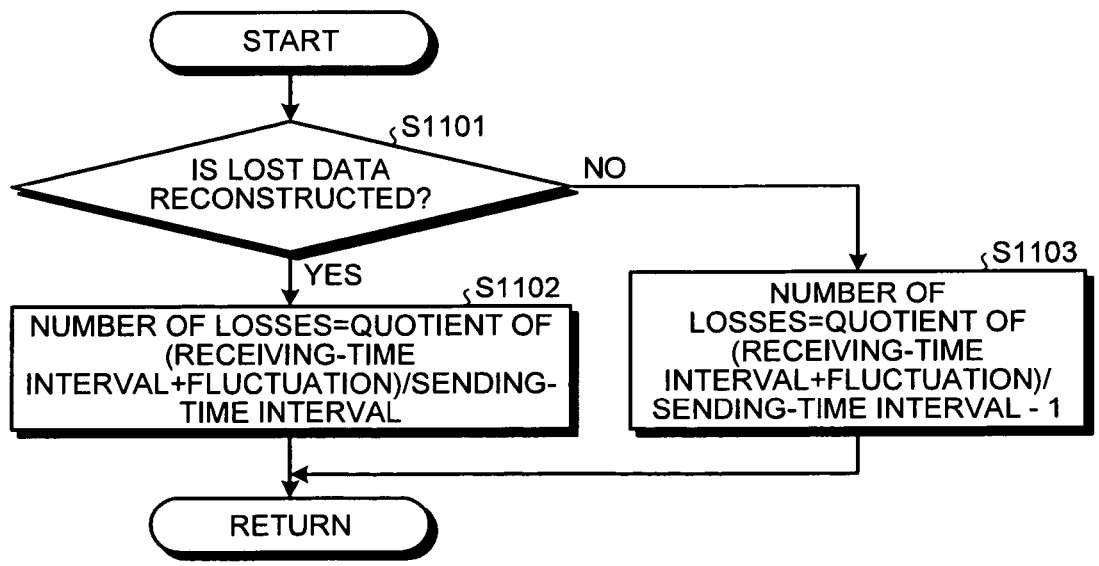
FIG. 7C is a flowchart of another process performed by the monitoring device according to the second embodiment.

Processes performed by the monitoring device 10 are described below with reference to FIGS. 7A to 7C according to the second embodiment. FIGS. 7A to 7C are flowcharts of processes performed by the monitoring device 10 according to the second embodiment.

As illustrated in FIG. 7A, when the communication interface 11 of the monitoring device 10 captures a packet (Step S101), the data receiving unit 12a extracts the packet received by the communication interface (Step S102). The data receiving unit 12a then sorts the packet by session (Step S103).

After that, the receiving-time extracting unit 12b acquires a receiving time of the packet (Step S104), and sends the receiving time to the loss determining unit. The loss determining unit 12c compares the receiving time with a receiving time of an immediately previous packet and calculates a receiving-time interval between the received receiving time and the receiving time of the immediately previous packet (Step S105). After that, a process for setting a loss determining threshold is performed (Step S106).

The process for setting a loss determining threshold is described below with reference to FIG. 7B. As illustrated in FIG. 7B, because, in the second embodiment, lost data is not reconstructed (No at Step S1061), the loss determining threshold is set to a value of "the sending-time interval×2" (Step S1063).

Then, it is determined whether the receiving-time interval between the received receiving time and the receiving time of the immediately previous packet is the threshold or higher. If the receiving-time interval is determined to be the predetermined threshold or higher (Yes at Step S107), the loss determining unit 12c determines that a loss occurs (Step S108). If the receiving-time interval is shorter than the predetermined threshold (No at Step S107), it is determined that no loss occurs (Step S109). After that, the loss determining unit 12c calculates, using the receiving-time interval and the sending-time interval, a total number of losses (Step S110). The process for calculating a total number of losses is described below with reference to FIG. 7C. As illustrated in FIG. 7C, because, in the second embodiment, lost data is not reconstructed (No at Step S1101), the number of losses=(the quotient of the receiving-time interval÷the sending-time interval)−1 is calculated using the receiving-time interval and the sending-time interval (Step S1103).

The serial-number extracting unit 12d then extracts a sequence number from the packet received by the data receiving unit (Step S111). After that, the failure-section determining unit 12e calculates, using the extracted sequence number and a sequence number of the immediately previous packet, the number of losses occurring in the first section (RTP section) (Step S112). After that, the failure-section determining unit 12e calculates, using the number of losses calculated by the loss determining unit 12c and the number of losses occurring in the first section, the number of losses occurring in the second section (non-RTP section) (Step S113). If the receiving-time interval is determined to be a value shorter than the predetermined threshold (No at Step S107), the loss determining unit 12c determines that no loss occurs (Step S109).

Effects of Second Embodiment

As described above, the monitoring device 10 sequentially receives a packet assigned with a sequence number by the relay device 50 that is located between the sending device 20 and a receiving device 70, analyzes the received packet, extracts a receiving-time interval, determines whether the receiving-time interval is a predetermined threshold or higher, and then calculates the number of losses. Moreover, the monitoring device 10 extracts a sequence number from the received packet and calculates both the number of losses occurring in the first section and the number of losses occurring in the second section. If a loss is detected in the first section, the monitoring device 10 determines that a failure occurs in the non-RTP section covering from the sending device 20 to the relay device 50. If a loss is detected in the second section, the monitoring device 10 determines that a failure occurs in the RTP section covering from the relay device 50 to the monitoring device 10.

With this configuration, as illustrated in FIG. 8, positions where the monitoring device 10 can be installed are not limited. When one monitoring device 10 is located upstream of the relay device 50, monitor is conducted with a decreased number of monitoring points and a decreased number of installed monitoring devices 10. This reduces the costs for installation of monitoring devices 10. This also enables, without installing a monitoring device on the dividing point, determining a failure as either a failure occurring in the non-RTP section covering from the sending device 20 to the relay device 50 or a failure occurring in the RTP section covering from the relay device 50 to the monitoring device 10.

Moreover, in the second embodiment, the monitoring device 10 acquires a receiving time of a received packet, calculates a difference between the receiving time of the received packet and a receiving time of an immediately previous packet, and determines whether the difference between the receiving times is a predetermined threshold or higher. With this configuration, the monitoring device 10 can determine, using the difference between the receiving times of the packets, a delay in the receiving-time interval of the packet.

[c] Third Embodiment

Although, in the above second embodiment, a section where a packet is lost is identified, the present embodiments are not limited thereto. For example, it is allowable not only to identify a section where a packet is lost but also to calculate the number of losses occurring in a non-RTP section per unit time.

Figure 10B:
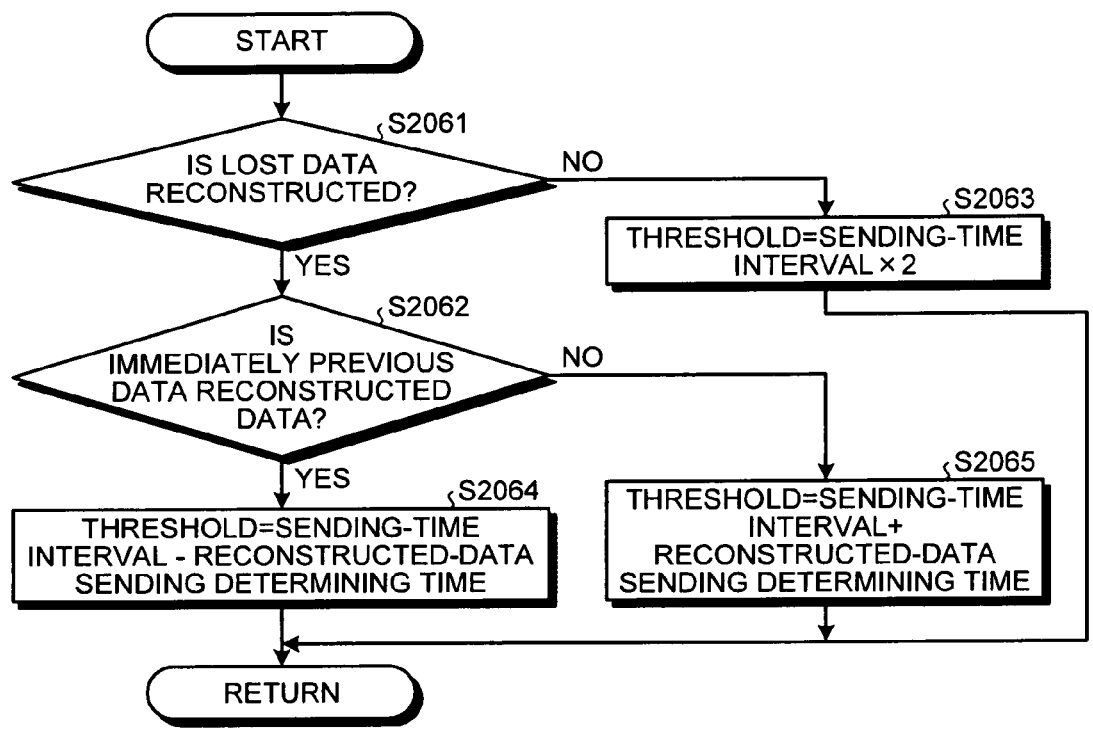
FIG. 10B is a flowchart of another process performed by the monitoring device according to the third embodiment.
Figure 10C:
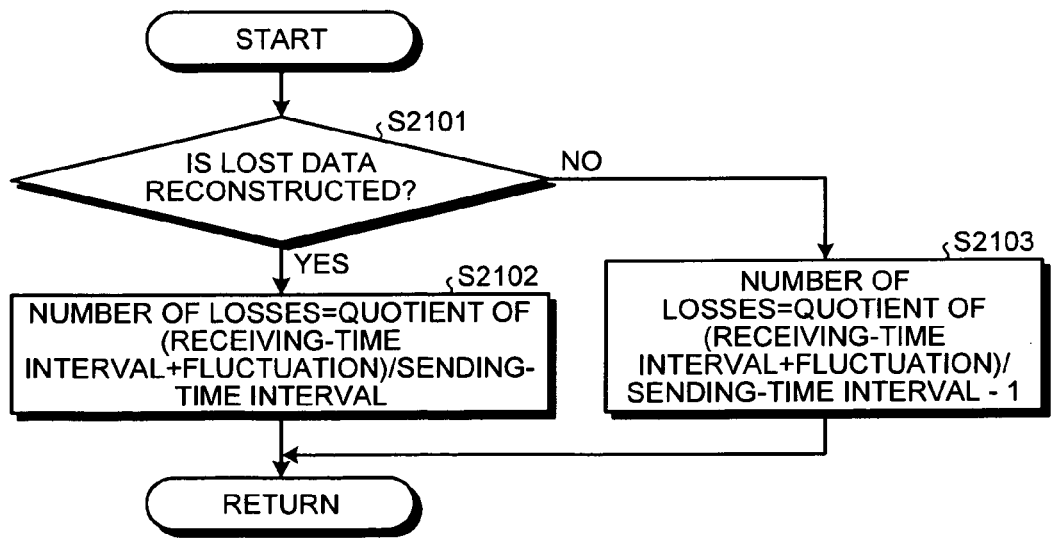
FIG. 10C is a flowchart of another process performed by the monitoring device according to the third embodiment.

In the following third embodiment where the number of losses occurring in an RTP section per unit time and the number of losses occurring in a non-RTP section per unit time are calculated, the functional configuration of a communication program 120A of a monitoring device according to the third embodiment and processes performed by the monitoring device are described with reference to FIGS. 9 and 10A to 10C. FIG. 9 is a block diagram of the functional configuration of a communication program executed by a monitoring device according to the third embodiment. FIGS. 10A to 10C are flowcharts of processes performed by the monitoring device according to the third embodiment.

As illustrated in FIG. 9, the communication program 120A of the monitoring device is different from the communication program 120 as illustrated in FIG. 4 in that a number-of-losses-per-unit-time calculating unit 12f is present.

In the above communication program 120A, the number-of-losses-per-unit-time calculating unit 12f calculates the number of losses occurring in the RTP section for a unit time and the number of losses occurring in the non-RTP section for a unit time. More particularly, the number-of-losses-per-unit-time calculating unit 12f has a counter that counts the number of losses occurring in the RTP section for a predetermined time and another counter that counts the number of losses occurring in the non-RTP section for the time. The number-of-losses-per-unit-time calculating unit 12f adds the number of losses occurring in the RTP section that is calculated by the failure-section determining unit 12e to the current counter that counts the number of losses occurring in the RTP section. Moreover, the number-of-losses-per-unit-time calculating unit 12f adds the number of losses occurring in the non-RTP section that is calculated by the failure-section determining unit 12e to the current counter that counts the number of losses occurring in the non-RTP section.

After that, the number-of-losses-per-unit-time calculating unit 12f determines whether the predetermined time has passed. If it is before passage of the predetermined time, the number-of-losses-per-unit-time calculating unit 12f repeats the counter-value adding process.

When the predetermined time has passed, the number-of-losses-per-unit-time calculating unit 12f determines the counter value to be the number of losses for the predetermined time and stores the counter value in a memory.

The processes performed when the monitoring device executes the communication program 120A are described with reference to FIGS. 10A to 10C according to the third embodiment. The communication program 120A according to the third embodiment is different from the communication program 120 executed by the monitoring device according to the second embodiment as illustrated in FIGS. 7A to 7C in that a process for counting the number of losses occurring in the non-RTP section for a unit time and a process for counting the number of losses occurring in the RTP section for a unit time are added.

More particularly, as illustrated in FIG. 10A, the receiving-time extracting unit 12b extracts a receiving time from a packet and sends the receiving time to the loss determining unit 12c (Step S204). The loss determining unit 12c calculates, using the receiving time received from the receiving-time extracting unit 12b and a receiving time of an immediately previous packet, the receiving-time interval between the receiving time of the packet received by the data receiving unit 12a and the receiving time of the immediately previous packet (Step S205), and sets the loss determining threshold (Step S206). As illustrated in FIG. 10B, because, in the third embodiment, lost data is not reconstructed (No at Step S2061), the loss determining threshold is set to a value of "the sending-time interval×2" (Step S2063).

After that, the loss determining unit 12c determines whether the receiving-time interval is the predetermined threshold or higher. If the receiving-time interval is determined to be the predetermined threshold or higher (Yes at Step S207), it is determined that a loss occurs (Step S208). If the receiving-time interval is determined to be a value shorter than the predetermined threshold (No at Step S207), it is determined that no loss occurs (Step S209). Then, the loss determining unit 12c calculates, using the receiving-time interval and the sending-time interval, the number of losses= (the quotient of the receiving-time interval÷the sending-time interval)−1 (Step S210). The process for calculating the total number of losses is described below with reference to FIG. 10C. As illustrated in FIG. 10C, because, in the third embodiment, lost data is not reconstructed (No at Step S2101), the number of losses=(the quotient of the receiving-time interval÷the sending-time interval)−1 is calculated using the receiving-time interval and the sending-time interval (Step S2103).

The serial-number extracting unit 12d extracts a sequence number from the packet received by the communication interface (Step S211), and sends the sequence number to the failure-section determining unit 12e. The failure-section determining unit 12e calculates, using the sequence number received from the serial-number extracting unit 12d and a sequence number of the immediately previous packet, the number of losses occurring in the RTP section (Step S212).

Using the number of losses calculated by the loss determining unit 12c and the number of losses occurring in the RTP section, the number of losses occurring in the non-RTP section is also calculated (Step S213). If a loss is detected in the RTP section, the number-of-losses-per-unit-time calculating unit 12f adds the number of losses occurring in the RTP section calculated by the failure-section determining unit 12e to the current counter that counts the number of losses occurring in the RTP section (Step S214). If a loss is detected in the RTP section, the number-of-losses-per-unit-time calculating unit 12f adds the number of losses occurring in the non-RTP section calculated by the failure-section determining unit 12e to the current counter that counts the number of losses occurring in the non-RTP section (Step S215).

After that, the number-of-losses-per-unit-time calculating unit 12f determines whether the predetermined time has passed. If it is before passage of the predetermined time, the number-of-losses-per-unit-time calculating unit 12f repeats the counter-value adding process (Steps S201 to S215).

When the predetermined time has passed (Yes at Step S216), the number-of-losses-per-unit-time calculating unit 12f determines the value of the counter that counts the number of losses occurring in the RTP section to be the number of losses occurring in the RTP section for the predetermined time and stores the value in the memory 12. The number-of-losses-per-unit-time calculating unit 12f also determines the value of the counter that counts the number of losses occurring in the non-RTP section to be the number of losses occurring in the non-RTP section for the predetermined time and stores the value in the memory 12. The process is thus completed.

As described above, the monitoring device in the third embodiment calculates the number of failures occurring in each of the RTP section and the non-RTP section for each predetermined time. Because, using the number of failures occurring in each of the RTP section and the non-RTP section, the number of packets lost in each of the RTP section and the non-RTP section is calculated. These calculated values are useful for appropriate monitoring of the communication quality.

[d] Fourth Embodiment

In some cases, when the relay device detects a packet loss, it creates a complementary packet. Moreover, in some other cases, when the relay device detects a packet loss, it notifies the terminal of the packet loss and then the terminal re-sends the packet. In such a situation, it is allowable to configure the monitoring device to detect any reconstructed packet that is either a complementary packet or a re-sent packet and identifies a section where the packet is lost.

Figure 11:
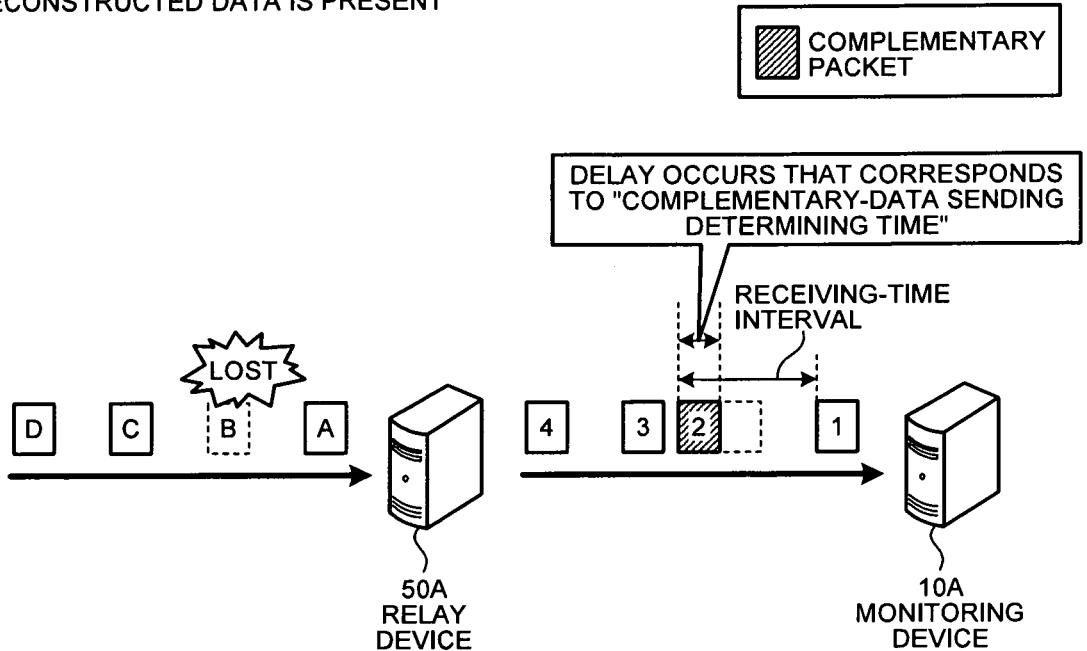
FIG. 11 is a schematic diagram that illustrates a delay when reconstructed data is present.
Figure 12:
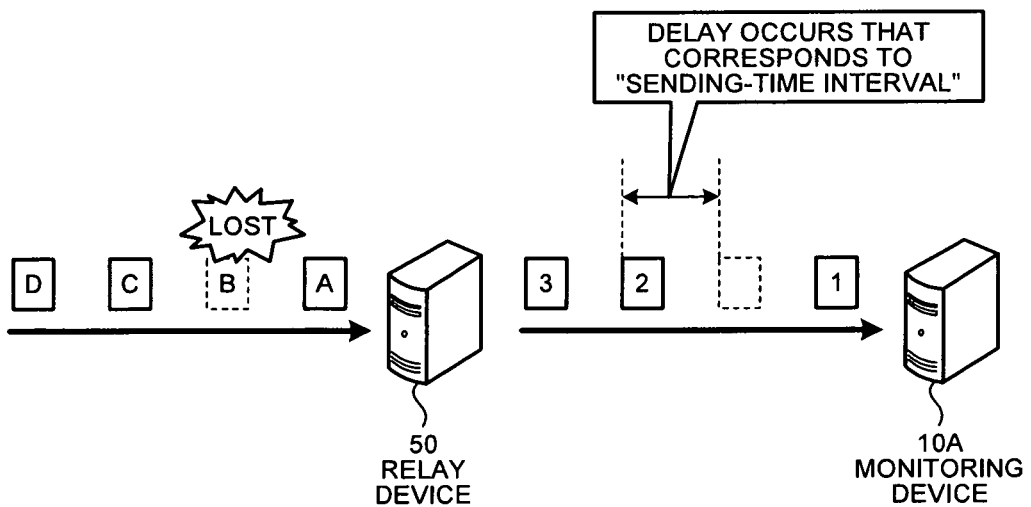
FIG. 12 is a schematic diagram that illustrates a delay when no reconstructed data is present.
Figure 13:
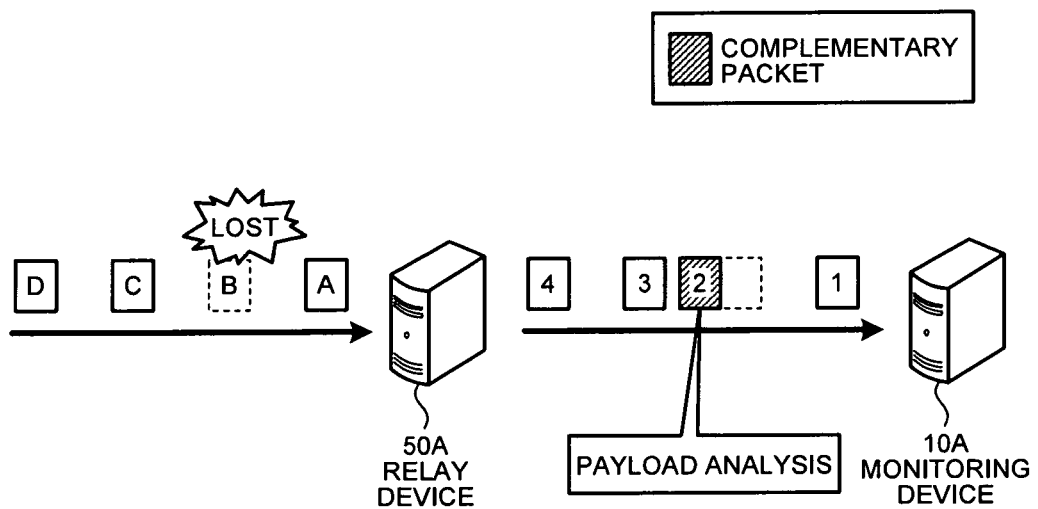
FIG. 13 is a schematic diagram that illustrates a process for analyzing a payload.
Figure 14A:
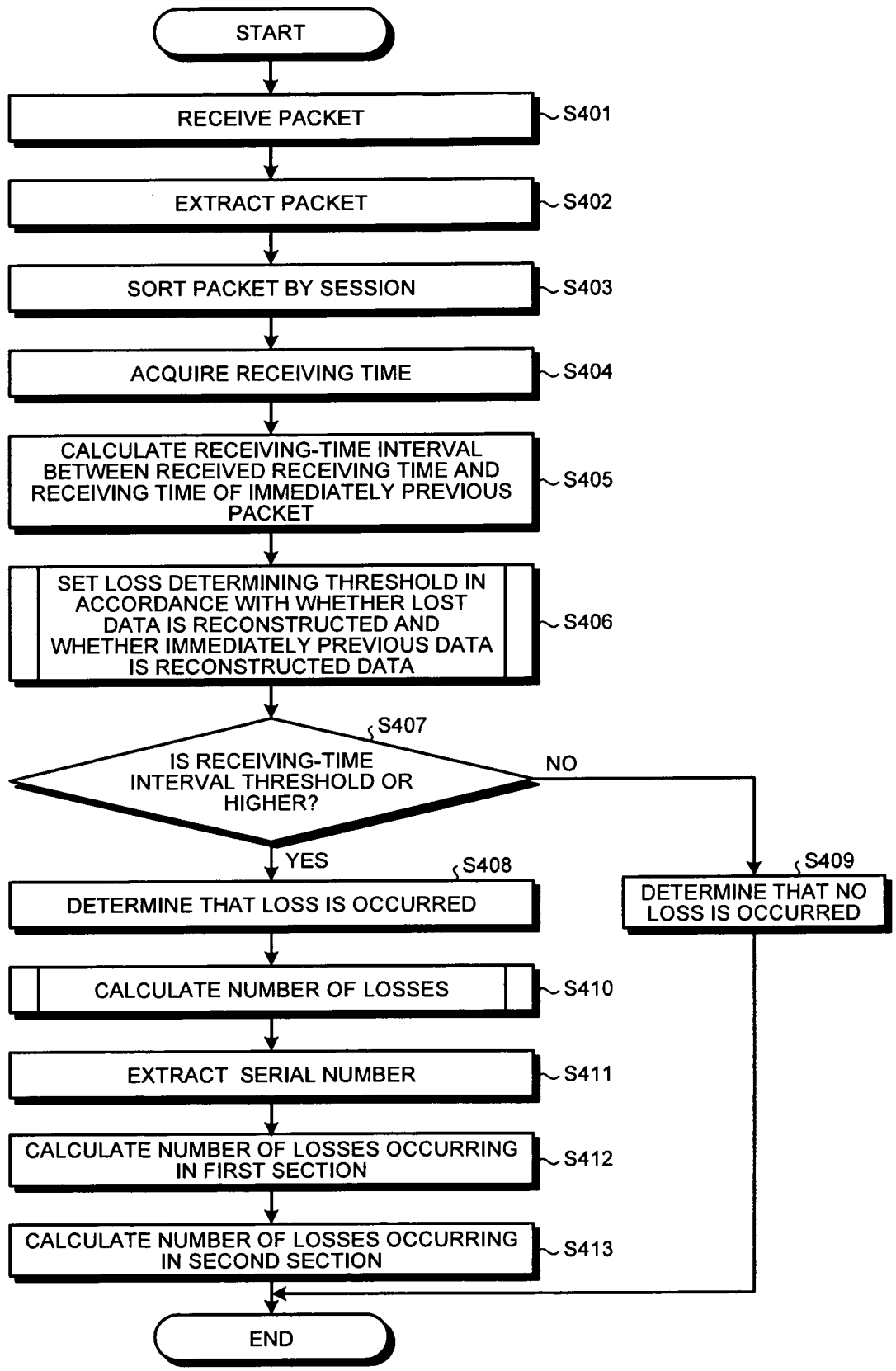
FIG. 14A is a flowchart of a process performed by the monitoring device according to a fourth embodiment.
Figure 14B:
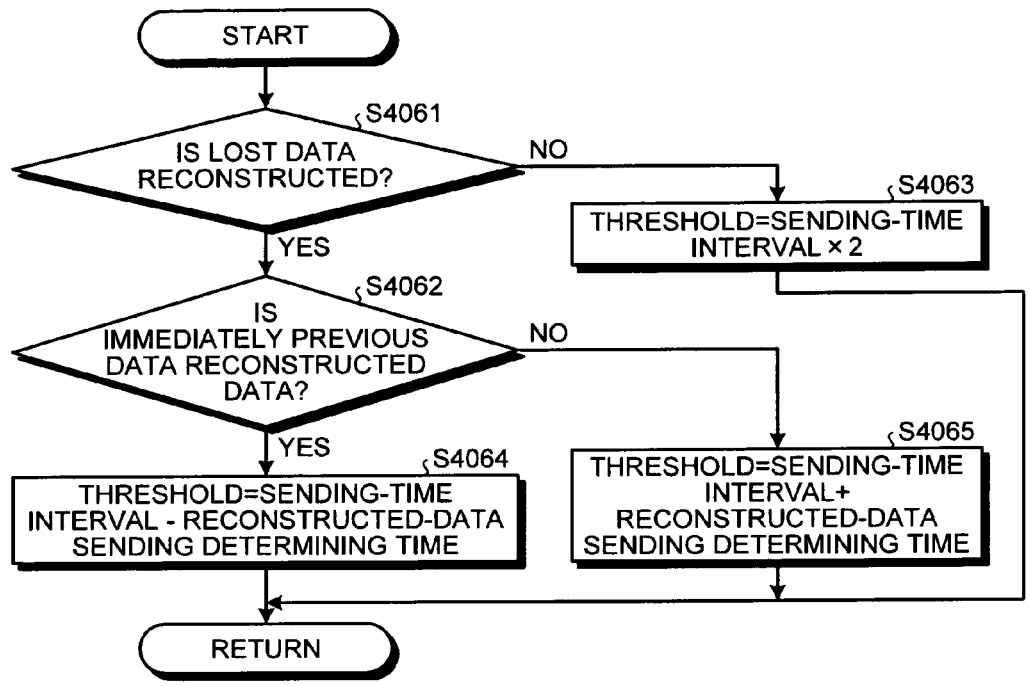
FIG. 14B is a flowchart of another process performed by the monitoring device according to the fourth embodiment.
Figure 14C:
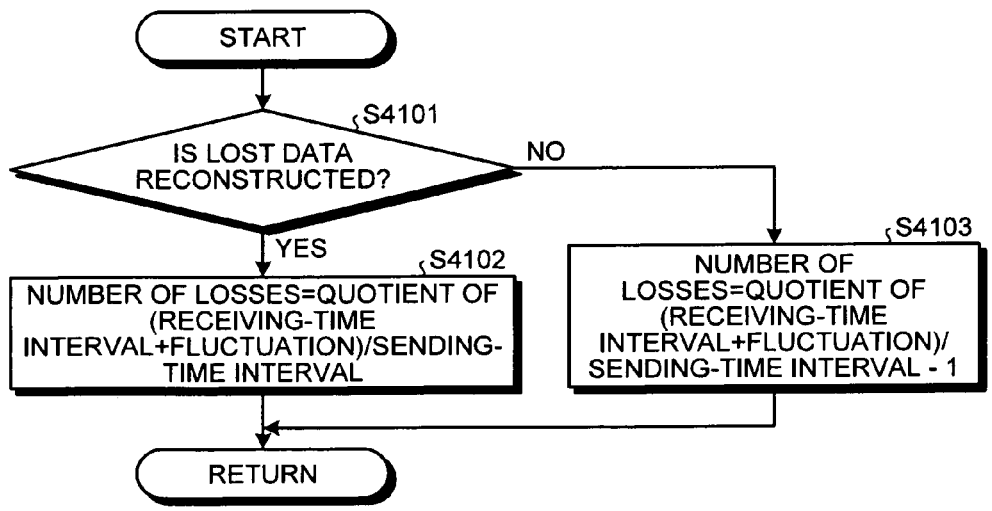
FIG. 14C is a flowchart of another process performed by the monitoring device according to the fourth embodiment.

In the following fourth embodiment, the monitoring device detects a complementary packet and identifies a section where the packet is lost. The monitoring device according to the fourth embodiment is described with reference to FIGS. 11 to 14C. FIG. 11 is a schematic diagram that illustrates a delay when reconstructed data is present. FIG. 12 is a schematic diagram that illustrates a delay when no reconstructed data is present. FIG. 13 is a schematic diagram that illustrates a process for analyzing a payload. FIGS. 14A to 14C are flowcharts of processes performed by the monitoring device according to the fourth embodiment.

A process for detecting reconstructed data that is a complementary packet created by the relay device, i.e., is described below with reference to FIGS. 11 and 12. FIG. 11 is a schematic diagram that illustrates a delay when reconstructed data is present. FIG. 12 is a schematic diagram that illustrates a delay when no reconstructed data is present. In the example illustrated in FIG. 11, packets A to D are sent but the packet "B" is lost at a position before a relay device 50A. The relay device 50A receives the other packets A, C, and D.

The relay device 50A detects a packet loss and inserts a complementary packet as a substitute for the lost packet "B". The relay device 50A then assigns the sequence number 1 to the packet A, the sequence number 2 to the complementary packet that is the substitute for the packet B, the sequence number 3 to the packet C, and the sequence number 4 to the packet D and then forwards the packets toward the receiving device.

After that, a monitoring device 10A according to the fourth embodiment sequentially receives the packets assigned with the sequence numbers 1 to 4 from the relay device 50A. The monitoring device 10A receives the complementary packet assigned with the sequence number 2 at a time different from a time when, if the packet B were not missing, the packet B would be received.

This is because a delay occurs that corresponds to a time required for the relay device 50A to detect the packet loss, create the complementary packet, and insert the complementary packet. As a result, a receiving-time interval increases between a time when the packet assigned with the sequence number "1" is received and a time when the packet assigned with the sequence number "2". Therefore, the monitoring device 10A can detect the complementary packet by monitoring receiving-time intervals between packets. In other words, the monitoring device 10A can identify the complementary packet as a packet lost in the non-RTP section.

In contrast, if the relay device 50 does not insert the complementary packet as in the example illustrated in FIG. 12, the relay device 50 receives the packets A, C, and D and assigns the sequence numbers 1, 2, and 3 to the packets A, C, and D, respectively. Because the monitoring device 10 cannot receive the packet "B", an interval increases between the packet assigned with the sequence number "1" and the packet assigned with the sequence number "2" and a delay occurs that is larger than a delay illustrated in FIG. 11.

Although, as described above, the monitoring device 10A in the fourth embodiment detects the complementary packet by monitoring receiving-time intervals between packets, the monitoring device 10A can be configured to detect the complementary packet by analyzing a payload of the complementary packet.

If, as illustrated in the example of FIG. 13, the packets A to D are sent but the packet "B" is lost at a point before the relay device 50A, the relay device 50A detects a packet loss, creates a complementary packet as a substitute for the lost packet "B", and inserts the complementary packet. In this example, the relay device 50A creates a complementary packet having a particularly patterned payload, assigns the sequence number "2" to the created complementary packet, and forwards the complementary packet as a substitute for the lost packet "B".

Upon sequentially receiving the packets from the relay device 50A, the monitoring device 10A analyzes a payload of a received packet and determines whether the pattern of the payload is accordant with the particular pattern. If the pattern of the payload of the received packet is accordant with the particular pattern, the monitoring device 10A determines that the packet is a complementary packet.

In other words, the monitoring device 10A can identify the complementary packet as a packet lost in the non-RTP section. It is allowable to configure the relay device 50A to create a complementary packet having a copy of a payload of an immediately previous packet. If so, the monitoring device 10A determines whether a packet is a copy of an immediately previous packet, thereby detecting a complementary packet.

Processes performed by the monitoring device 10A are described below with reference to FIGS. 14A to 14C according to the fourth embodiment. FIGS. 14A to 14C are flowcharts of processes performed by the monitoring device according to the fourth embodiment. The processes performed by the monitoring device 10A according to the fourth embodiment are almost the same as the processes illustrated in FIGS. 7A to 7C according to the second embodiment but the processes are different in a delay threshold.

As illustrated in FIG. 14A, when the communication interface of the monitoring device captures a packet (Step S401), the data receiving unit selects the packet received by the communication interface (Step S402). The data receiving unit then sorts the packet by session (Step S403).

After that, the receiving-time extracting unit acquires a receiving time of the packet (Step S404), and sends the receiving time to the loss determining unit. The loss determining unit compares the receiving time with a receiving time of an immediately previous packet and calculates a receiving-time interval between the received receiving time and the receiving time of the immediately previous packet (Step S405). After that, a process for setting a loss determining threshold is performed (Step S406).

The process for setting a loss determining threshold is described below with reference to FIG. 14B. As illustrated in FIG. 14B, because, in the fourth embodiment, lost data is reconstructed (Yes at Step S4061), it is determined whether the immediately previous packet is reconstructed data (Step S4062). If the immediately previous packet is reconstructed data (Yes at Step S4062), the predetermined threshold is set to a value of "the sending-time interval−the reconstructed-data sending determining time" (Step S4064). If the immediately previous packet is not reconstructed data (No at Step S4062), the predetermined threshold is set to a value of "the sending-time interval+the reconstructed-data sending determining time" (Step S4065).

Thereafter, it is determined whether the receiving-time interval between the receiving time of the received packet and the receiving time of the immediately previous packet is the predetermined threshold or higher. If the receiving-time interval is the predetermined threshold or higher (Yes at Step S407), the loss determining unit determines that a loss occurs (Step S408). If the receiving-time interval is shorter than the predetermined threshold (No at Step S407), it is determined that no loss occurs (Step S409). The loss determining unit then calculates, using the receiving-time interval and the sending-time interval, the number of losses (Step S410). The process for calculating the number of losses is described below with reference to FIG. 14C. As illustrated in FIG. 14C, because, in the fourth embodiment, lost data is reconstructed (Yes at Step S4101), the number of losses=(the quotient of the receiving-time interval/the sending-time interval) is calculated using the receiving-time interval and the sending-time interval (Step S4102).

The serial-number extracting unit extracts a sequence number from the packet received by the data receiving unit. The failure-section determining unit calculates, using the extracted sequence number and a sequence number of the immediately previous packet, the number of losses occurring in the first section (the RTP section). The failure-section determining unit also calculates, using the number of losses calculated by the loss determining unit and the number of losses occurring in the first section, the number of losses occurring in the second section (the non-RTP section). If the receiving-time interval is determined to be a value shorter than the predetermined threshold (No at Step S407), the loss determining unit determines that no loss occurs (Step S409). The subsequent processes from Steps S411 to 5413 are the same as the processes from Steps S111 to S113 of the second embodiment.

As described above, in the fourth embodiment, the monitoring device 10A determines whether a received packet is a complementary packet that is created by the relay device 50A and, if the receiving packet is a complementary packet, determines that a failure occurs in the non-RTP section covering from the sending device 20 to the relay device 50. With this configuration, even if the relay device 50A creates a complementary packet, a correct failure section is identified.

As described above, in the fourth embodiment, if a receiving-time interval is a predetermined threshold or higher, the monitoring device 10A determines the packet to be a complementary packet. With this configuration, the monitoring device 10A can identify any complementary packet using receiving-time intervals.

Moreover, in the fourth embodiment, the monitoring device 10A can be configured to determine whether the pattern of a received packet is accordant with a particular pattern and determines, if the patterns are accordant, the received packet to be a complementary packet. Moreover, the monitoring device 10A can be configured to identify any complementary packet by checking the contents of received packets.

[e] Fifth Embodiment

A delay of data having a fluctuation is described with reference to FIG. 18. If data has no fluctuation, data arrives at an interval equal to the sending-time interval and, as illustrate in the upper section of FIG. 18, the receiving-time interval of the packet C (assigned with the sequence number 2) is 40 ms. In contrast, if data has a fluctuation, data arrives at an interval unequal to the sending-time interval and, as illustrated in the lower section of FIG. 18, the receiving-time interval of the packet C (assigned with the sequence number 2) is 39 ms.

Figure 19A:
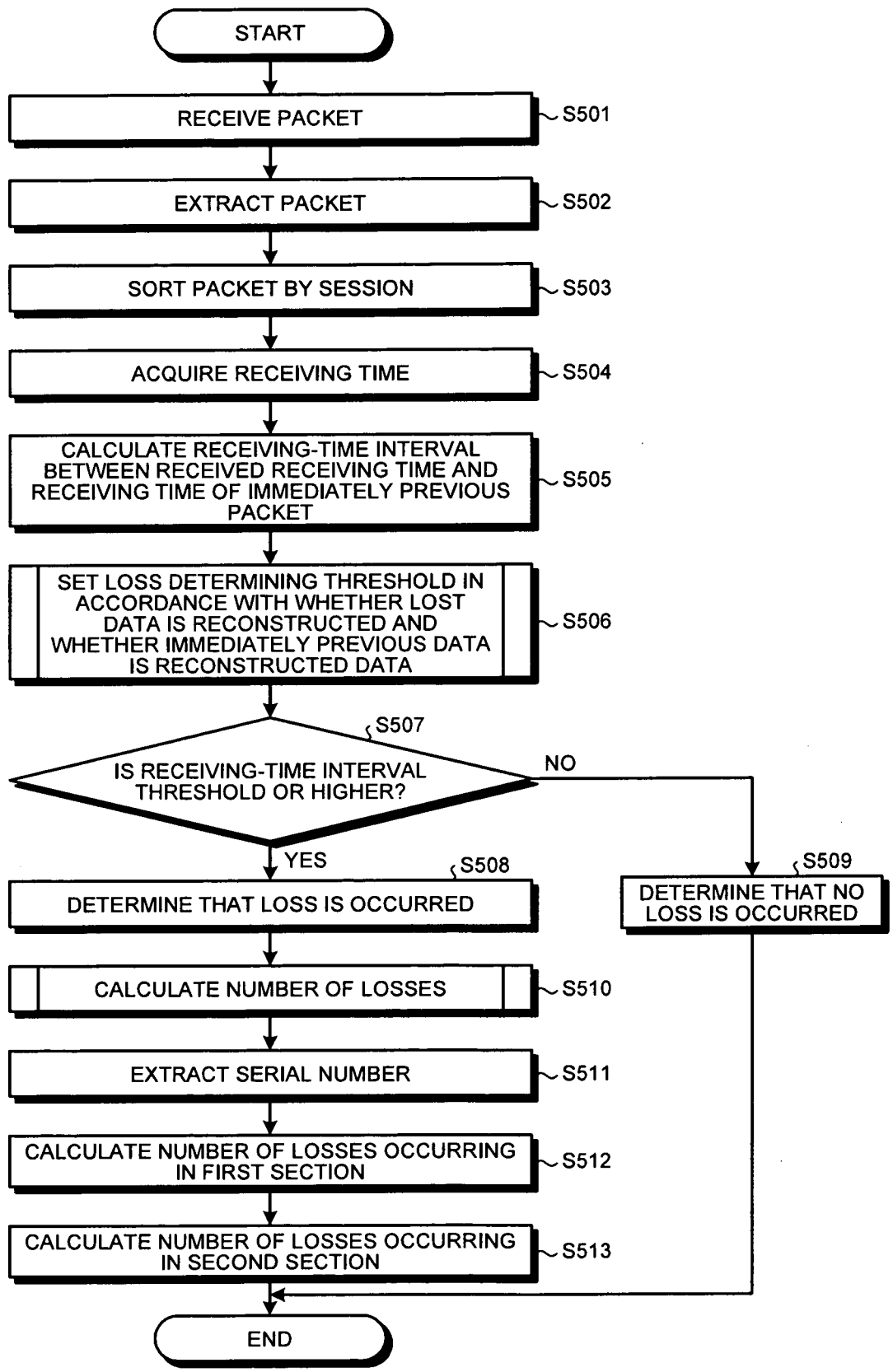
FIG. 19A is a flowchart of a process performed by a monitoring device according to a fifth embodiment.
Figure 19B:
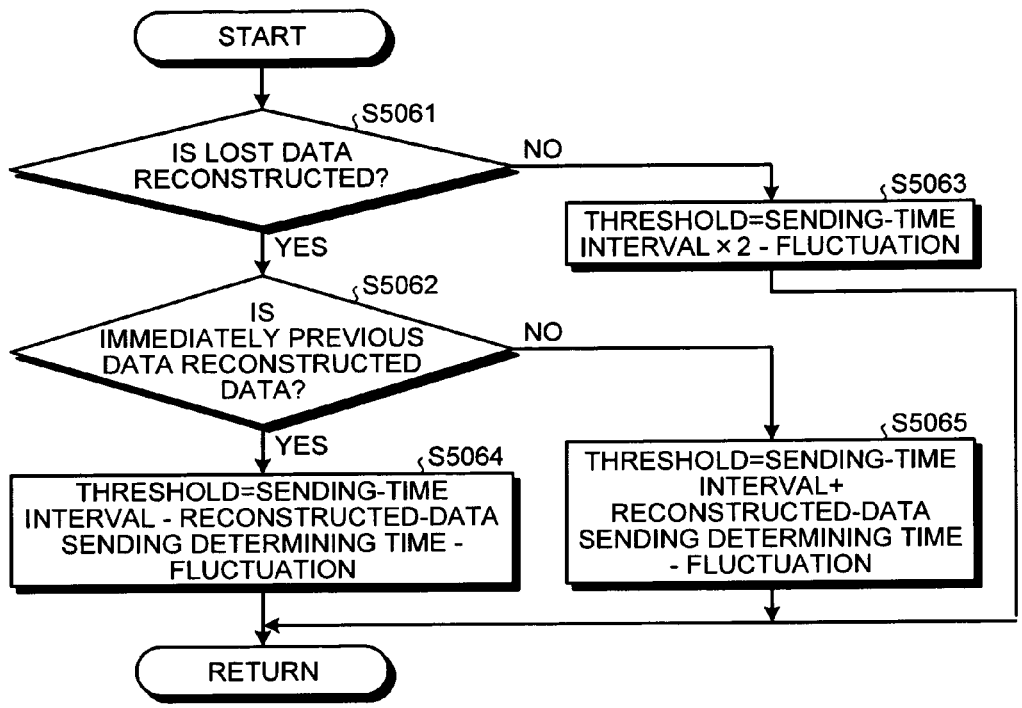
FIG. 19B is a flowchart of another process performed by a monitoring device according to the fifth embodiment.
Figure 19C:
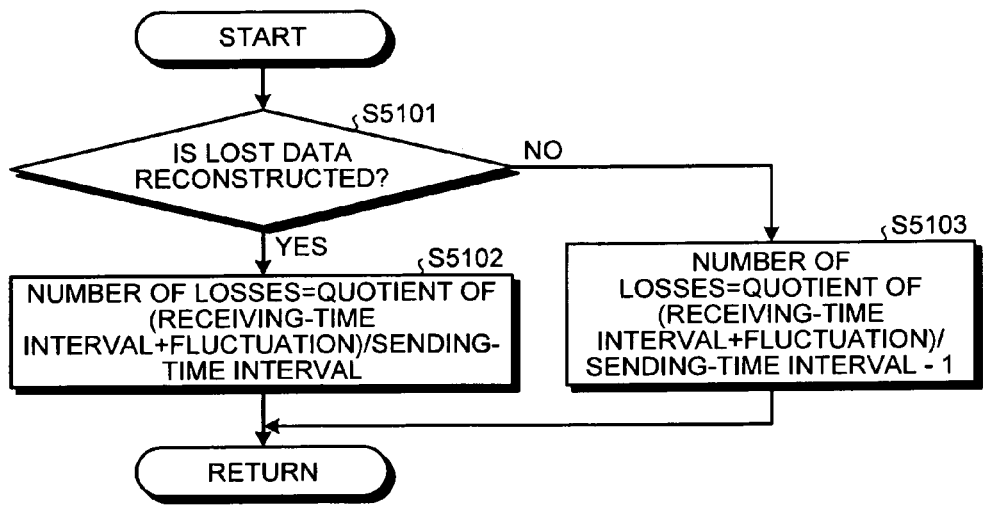
FIG. 19C is a flowchart of another process performed by a monitoring device according to the fifth embodiment.

As illustrated in FIGS. 19A and 19B, in order to detect a loss regardless of a fluctuation, during the process for setting a loss determining threshold (Step S506), the loss determining threshold is set to have an allowance (Steps S5063, S5064, and S5065). As illustrated in FIGS. 19A and 19C, during the process for calculating the total number of losses (Step S510), the number of losses is calculated with the allowance taken into consideration (Steps S5102 and S5103).

[f] Sixth Embodiment

Although the present invention are embodied variously as the first to the fifth embodiments, the present invention can be embodied in yet another way. In the following, some other embodiments of the present invention are described as the sixth embodiment.

(1) Iu-UP Section

Although, in the second to the fifth embodiments, a monitoring device is used in a communication system having a non-RTP section and an RTP section, the configuration is not limited thereto. For example, a monitoring device can be used in a communication system having a non-Iu-UP section and an Iu-UP section.

Figure 15:
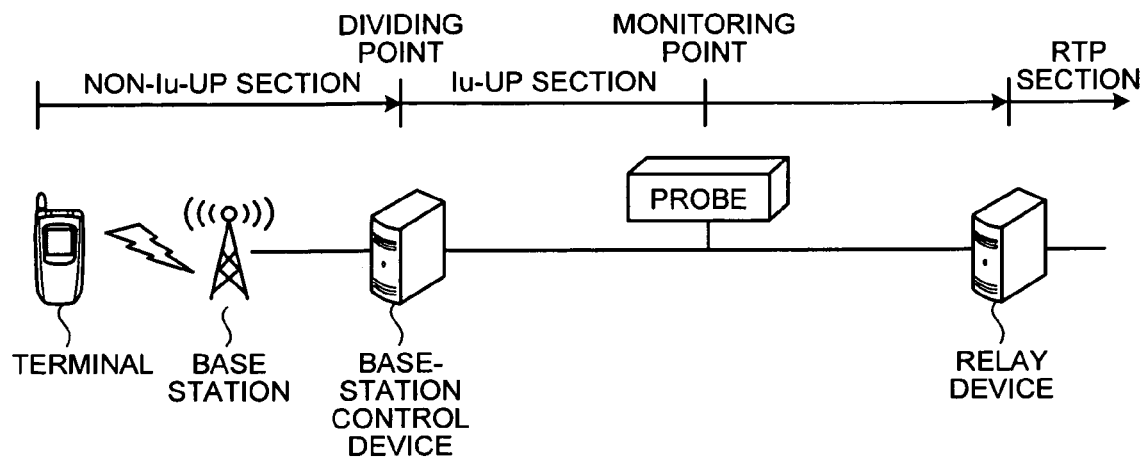
FIG. 15 is a schematic diagram of the configuration of a communication system.

More particularly, as illustrated in FIG. 15, the communication system has a non-Iu-UP section and an Iu-UP. Any packet in the Iu-UP section has a frame number in the Iu-UP header. In the same manner as in the second to the fifth embodiments, the monitoring device identifies, using the receiving-time intervals of packets and the frame numbers stored in Iu-UP headers, a lost packet as either a packet lost in the non-Iu-UP section or a packet lost in the Iu-UP section.

(2) System Configuration, etc.

The constituent elements of the device illustrated in the drawings are merely conceptual, and need not be physically configured as illustrated. The constituent elements, as a whole or in part, can be separated or integrated either functionally or physically based on various types of loads or use conditions. For example, the data receiving unit 12a and the serial-number extracting unit 12d can be integrated to one unit.

(3) Program

Figure 16:
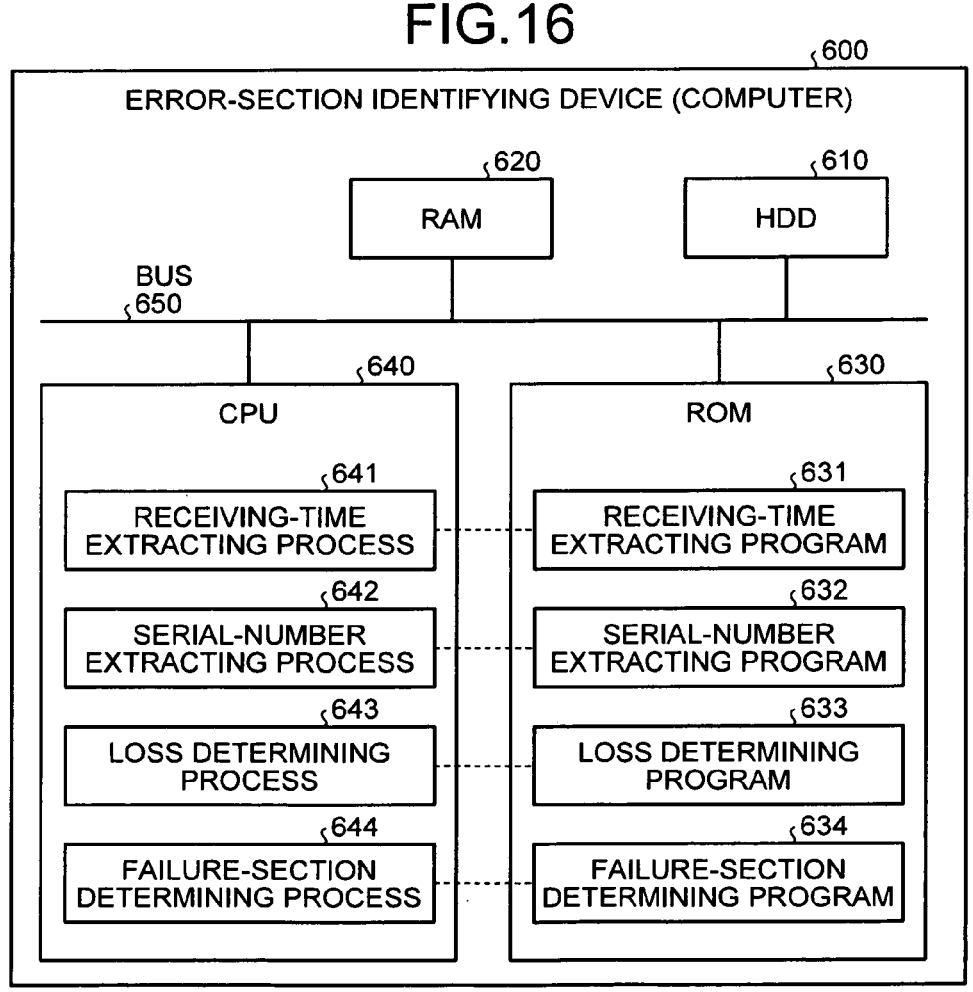
FIG. 16 is a block diagram of a computer that executes a failure-section determining program.
Figure 17:
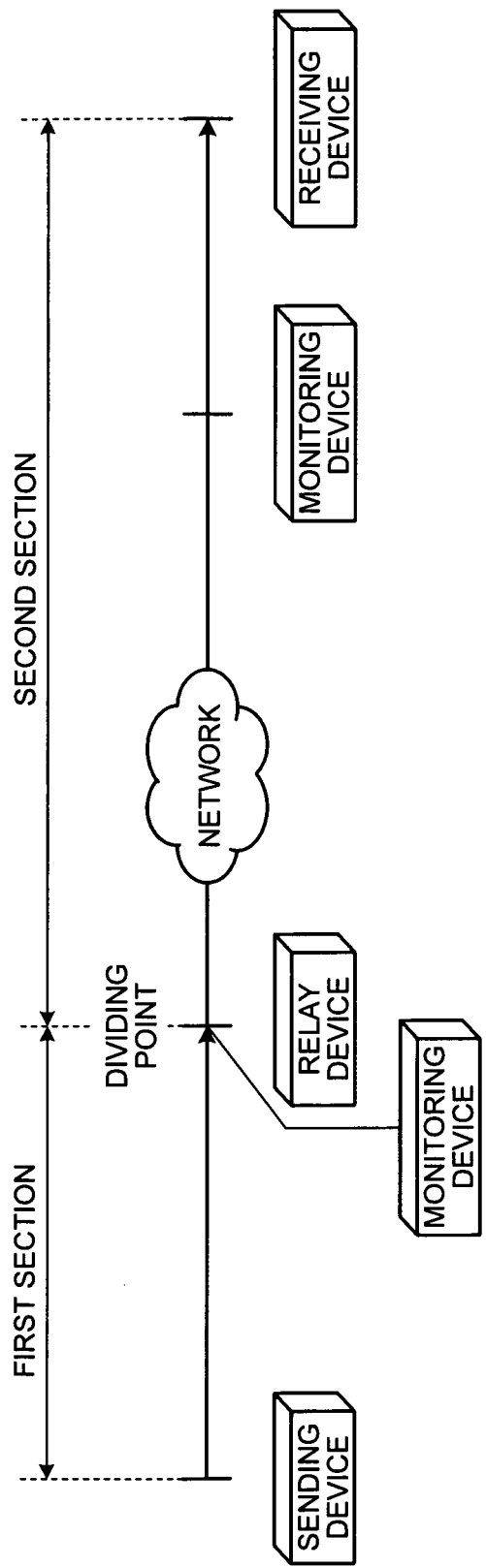
FIG. 17 is a schematic diagram that illustrates positions where monitoring devices are installed in a conventional communication system.

The various processes described in the above embodiments can be implemented when a computer executes a predetermined program. In the following, an example of a computer described with reference to FIG. 16 that executes a program to implement the same functions as those described in the above embodiments. FIG. 16 is a block diagram of a computer that executes a failure-section determining program.

As illustrated in FIG. 16, a computer 600 that functions as a failure-section determining device includes an HDD 610, a RAM 620, a ROM 630, and a CPU 640, all of which being connected to each other via a bus 650.

The ROM 630 prestores therein a failure-section determining program that includes, as illustrated in FIG. 16, a receiving-time extracting program 631, a serial-number extracting program 632, a loss determining program 633, and a failure-section determining program 634 to implement the same function as those in the above embodiments.

When the CPU 640 reads the programs 631 to 634 from the ROM 630 and then executes the programs 631 to 634, as illustrated in FIG. 16, the programs 631 to 634 are activated as a receiving-time extracting process 641, a serial-number extracting process 642, a loss determining process 643, and a failure-section determining process 644, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A failure-section determining device that is located between a relay device and a receiving device, the relay device being located between a sending device and the receiving device, the failure-section determining device comprising:
   a data receiving unit that sequentially receives data assigned with a serial number by the relay device;
   a receiving-time acquiring unit that acquires a receiving time of the data received by the data receiving unit;
   a loss determining unit that calculates a receiving-time interval using the receiving time and a receiving time of immediately previous data, determines that a loss occurs when the receiving-time interval is a predetermined threshold or higher, and calculates the number of losses using the receiving-time interval and a data sending-time interval;
   a serial-number acquiring unit that acquires the serial number of the data received by the data receiving unit; and
   a failure-section determining unit that calculates the number of losses occurring in a first section between the sending device and the relay device, using the serial number acquired by the serial-number acquiring unit and a serial number of an immediately previous packet, and calculates the number of losses occurring in a second section between the relay device and the monitoring device, using the number of losses calculated by the loss determining unit and the number of losses occurring in the first section.

2. The failure-section determining device according to claim 1, wherein, when lost data is not reconstructed, the predetermined threshold is set to a value twice as high as the sending interval.

3. The failure-section determining device according to claim 1, wherein
   when lost data is reconstructed, the predetermined threshold is set to a sum of the sending interval and a reconstructed-data sending determining time, and
   when the immediately previous data is reconstructed data, the predetermined threshold is set to a difference between the sending interval and the reconstructed-data sending determining time.

4. The failure-section determining device according to claim 3, wherein, when a pattern of the data received by the data receiving unit is accordant with a particular pattern, the loss determining unit determines the data to be complementary data.

5. The failure-section determining device according to claim 1, further comprising a number-of-losses-per-unit-time calculating unit that calculates both an accumulated total of the number of losses occurring in the first section calculated by the loss determining unit for a unit time and an accumulated total of the number of losses occurring in the second section calculated by the loss determining unit for a unit time.

6. The failure-section determining device according to claim 1, wherein the loss determining unit determines based on data fluctuation into consideration whether a loss occurs.

7. A failure-section determining method performed in a monitoring device that is located between a relay device and a receiving device, the relay device being located between a sending device and the receiving device, the failure-section determining method comprising:
   sequentially receiving data assigned with a serial number by the relay device;
   acquiring a receiving time of the data received by the data receiving unit;
   calculating a receiving-time interval using the receiving time and a receiving time of immediately previous data;
   determining that a loss occurs when the receiving-time interval is a predetermined threshold or higher;
   calculating the number of losses using the receiving-time interval and a data sending-time interval;
   acquiring the serial number of the received data; and
   calculating the number of losses occurring in a first section between the sending device and the relay device, using the acquired serial number and a serial number of an immediately previous packet; and
   calculating the number of losses occurring in a second section between the relay device and the monitoring device, using the number of losses occurring in the first section and the number of losses calculated at the calculating the number of losses using the receiving-time interval and the data sending-time interval.

8. A computer-readable, non-transitory medium storing a failure-section determining program for a monitoring device that is located between a relay device and a receiving device, the relay device being located between a sending device and the receiving device, the failure-section determining program causing a computer to execute a process, the process comprising:
   sequentially receiving data assigned with a serial number by the relay device;
   acquiring a receiving time of the data received by the data receiving unit;
   calculating a receiving-time interval using the receiving time and a receiving time of immediately previous data;

determining that a loss occurs when the receiving-time interval is a predetermined threshold or higher;

calculating the number of losses using the receiving-time interval and a data sending-time interval;

acquiring the serial number of the received data; and calculating the number of losses occurring in a first section between the sending device and the relay device, using the acquired serial number and a serial number of an immediately previous packet; and calculating the number of losses occurring in a second section between the relay device and the monitoring device, using the number of losses occurring in the first section and the number of losses calculated at the calculating the number of losses using the receiving-time interval and the data sending-time interval.

* * * * *